March 2, 1943. B. M. HYMAN ET AL Re. 22,279

CORN PICKER

Original Filed May 27, 1938 14 Sheets-Sheet 1

Inventors
B.M.Hyman
R.C.Ferguson
By V.F.Lassagne
Atty.

March 2, 1943. B. M. HYMAN ET AL Re. 22,279
CORN PICKER
Original Filed May 27, 1938 14 Sheets-Sheet 2
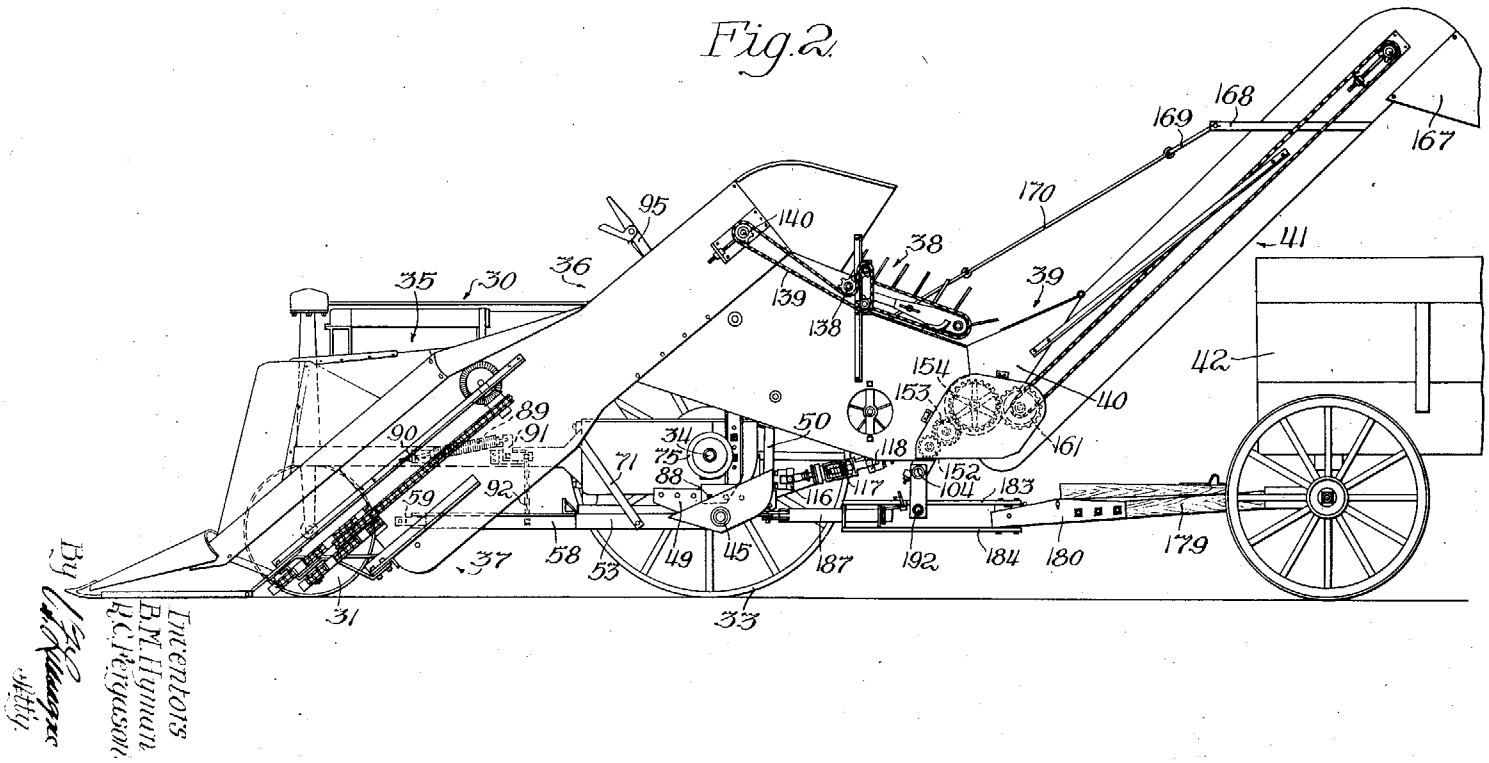

March 2, 1943. B. M. HYMAN ET AL Re. 22,279
CORN PICKER
Original Filed May 27, 1938 14 Sheets-Sheet 3
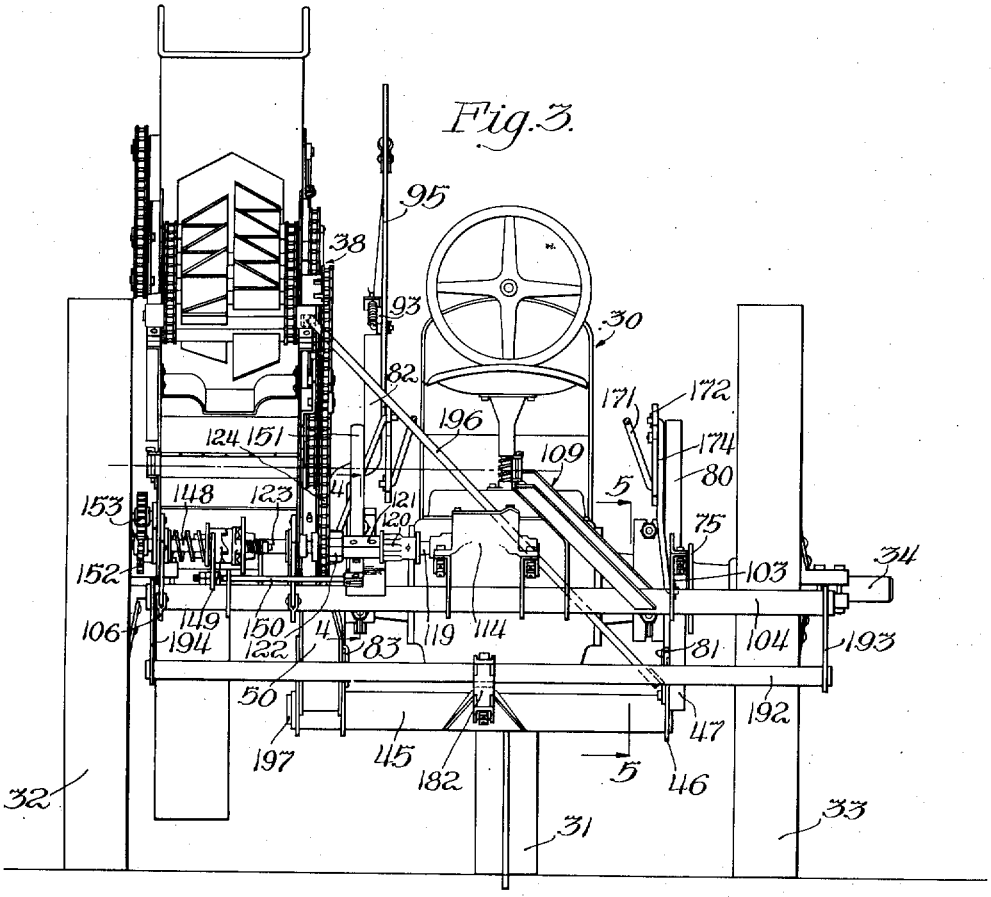
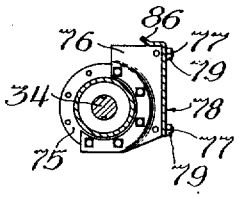
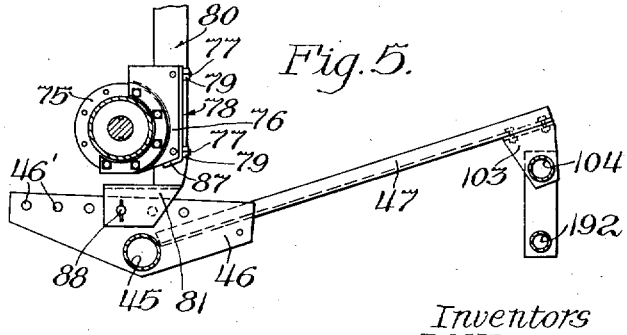
Inventors
B.M.Hyman
R.C.Fergason
By V.T. Lassagne
Att'y.

March 2, 1943. B. M. HYMAN ET AL Re. 22,279

CORN PICKER

Original Filed May 27, 1938 14 Sheets-Sheet 4

Inventors
B. M. Hyman
R. C. Ferguson
By V. J. Lavagne
Atty.

March 2, 1943. B. M. HYMAN ET AL Re. 22,279

CORN PICKER

Original Filed May 27, 1938 14 Sheets-Sheet 5

Inventors
B. M. Hyman
R. C. Fergason
By V. T. Lassagne
Atty.

March 2, 1943. B. M. HYMAN ET AL Re. 22,279
CORN PICKER
Original Filed May 27, 1938 14 Sheets-Sheet 6
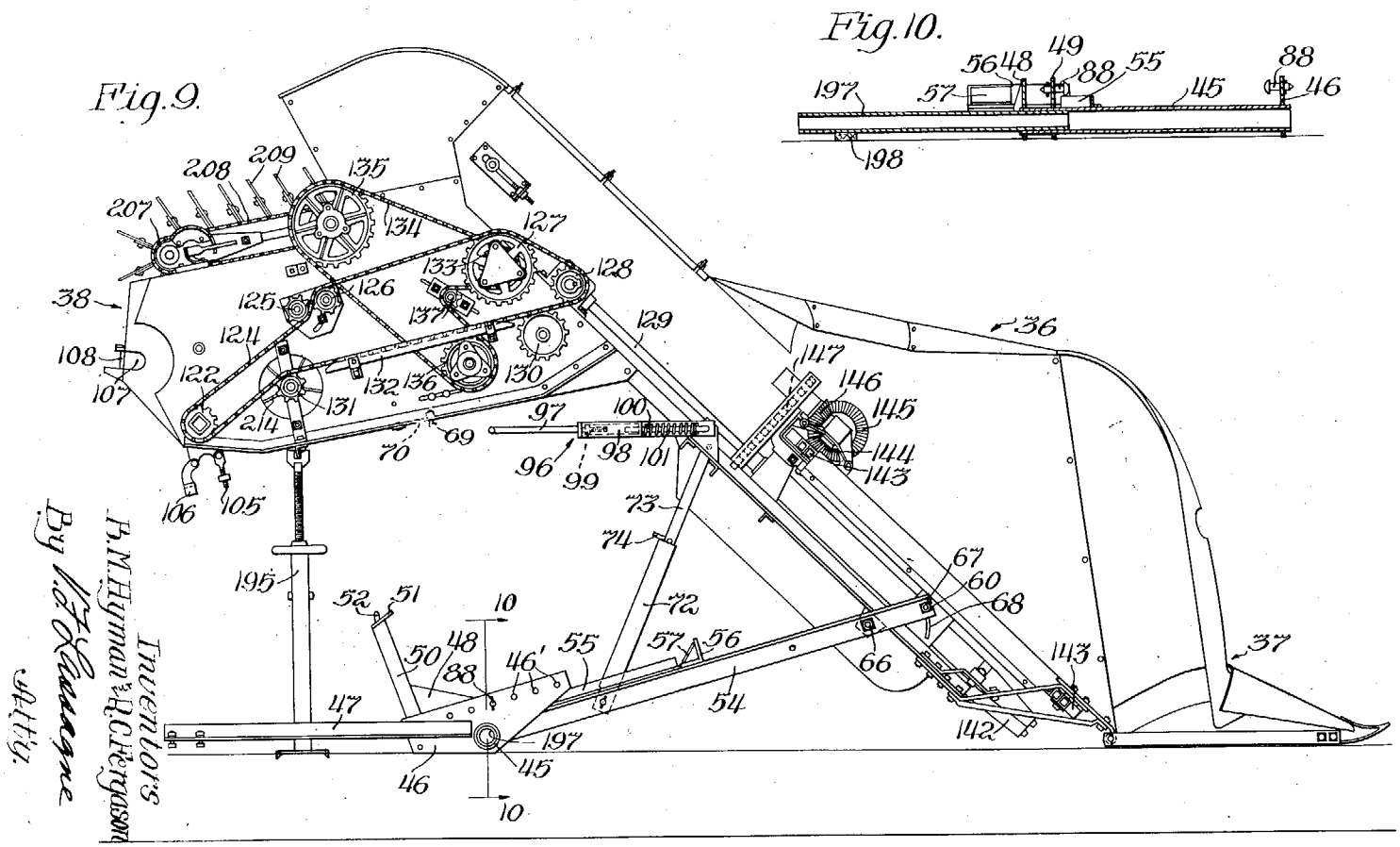

March 2, 1943. B. M. HYMAN ET AL Re. 22,279

CORN PICKER

Original Filed May 27, 1938 14 Sheets-Sheet 7

Inventors
B.M.Hyman
R.C.Ferguson
By V.F. Lasagne
Atty.

March 2, 1943. B. M. HYMAN ET AL Re. 22,279

CORN PICKER

Original Filed May 27, 1938 14 Sheets-Sheet 8

Inventors
B.M.Hyman
R.C.Ferguson
By V.J. Lasseigne
Att'y.

March 2, 1943. B. M. HYMAN ET AL Re. 22,279

CORN PICKER

Original Filed May 27, 1938 14 Sheets-Sheet 9

Inventors
B. M. Hyman
R. C. Ferguson
By V. T. Lassaque
Att'y.

March 2, 1943. B. M. HYMAN ET AL Re. 22,279

CORN PICKER

Original Filed May 27, 1938 14 Sheets-Sheet 10

Inventors
B. M. Hyman
H. C. Ferguson
By W. F. Lavagne
Atty.

March 2, 1943. B. M. HYMAN ET AL Re. 22,279

CORN PICKER

Original Filed May 27, 1938 14 Sheets-Sheet 11

Inventors
B.M.Hyman
R.C.Fergason
By V.J.Lusagne
Att'y.

March 2, 1943. B. M. HYMAN ET AL Re. 22,279

CORN PICKER

Original Filed May 27, 1938 14 Sheets-Sheet 12

Inventors
B. M. Hyman
R. C. Fergason
By V. F. Lussagne
Atty.

March 2, 1943. B. M. HYMAN ET AL Re. 22,279
CORN PICKER
Original Filed May 27, 1938 14 Sheets-Sheet 13
Fig. 22.
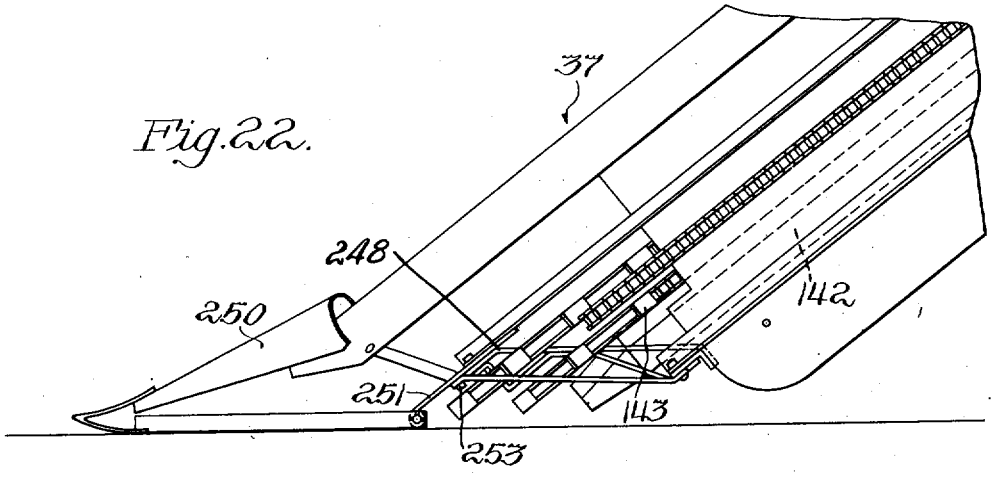
Fig. 21.
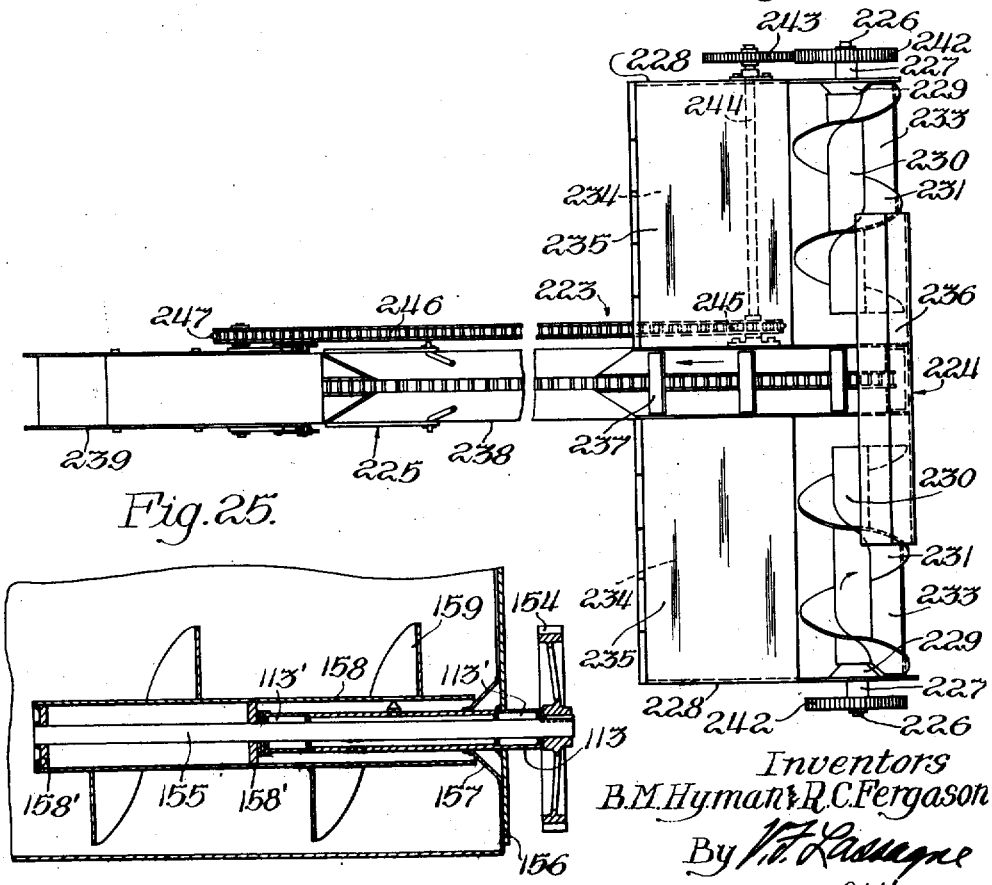
Fig. 25.
Inventors
B. M. Hyman & R. C. Ferguson
By V. T. Lassagne
Atty March 2, 1943. B. M. HYMAN ET AL Re. 22,279

CORN PICKER

Original Filed May 27, 1938 14 Sheets-Sheet 14

Inventors
B. M. Hyman & R. C. Ferguson
By V. F. Lassagne
Atty.

Reissued Mar. 2, 1943

Re. 22,279

UNITED STATES PATENT OFFICE 22,279

CORN PICKER

Benjamin M. Hyman, Moline, Ill., and Rector C. Fergason, La Porte, Ind., assignors to International Harvester Company, a corporation of New Jersey Original No. 2,255,168, dated September 9, 1941, Serial No. 210,464, May 27, 1938. Application for reissue December 1, 1941, Serial No. 421,254

53 Claims. (Cl. 56—18)

This invention relates to a corn harvester or picker. More particularly, it relates to a corn picker mounted on a tractor in such a way that a picking unit, composed of rigidly united gathering and husking units, is mounted in a balanced position over the rear axle of the tractor, and a second rigid unit, composed of an auger feed and a wagon elevator, is supported at the rear of the husking unit.

In corn harvesters or pickers of the type that are mounted on a tractor, it is desirable that the implement be capable of quick attachment to and detachment from the tractor and be easily controlled in its mounted position on the tractor. Tractor mounted corn harvesters of various types are well known and their construction often embodies the rigid attachment to the tractor of various devices, such as gathering units, husking units, and elevators. These units are generally cumbersome, hard to handle during operation, and difficult, if not impossible, to remove from the tractor. In some instances wherein the various units do not normally balance one another, heavy springs or bracing for this purpose is required. In other instances, corn pickers have been provided which have supporting wheels of their own and are not entirely supported through their mounting on the tractor.

The primary object of the invention is to provide an improved, tractor-mounted corn picker, which will not be subject to the disadvantages above mentioned.

Another object is to provide in a corn picker a rigid unit composed of husking and gathering units supported in balanced relation over the rear axle of a tractor.

Still another object is to provide for a corn picker a separate rigid unit composed of a feed device and a wagon elevator which is supported from the husker unit of the corn picker.

A further object is the provision of an improved feed between the husker unit and the wagon elevator of a corn picker.

Another object of the invention is to provide a corn picker which is supported in balanced relation over the rear axle of a tractor by a framework carried by and beneath the rear axle.

Still another object of the invention is the provision of quick attachable means for supporting a corn picker from points beneath the axle of a tractor.

Another object is the provision of rigidly united gathering and husker units which may be easily attached to and detached from a tractor.

A still further object is the provision of mechanism which will cause the wagon elevator to raise as the gathering unit is raised.

Another object is to provide a pair of rigid units, each composed of gathering and husker units in balanced relation over the opposite ends of the rear axle, and a third rigid unit composed of an auger feed device and a wagon elevator carried by the husker units.

Another object is to provide an improved device for use in conveying ears of corn between a husker unit and a wagon elevator.

A further object is the provision of an improved feed device of special form which may function as a reservoir.

Still another object is to provide a feed device between a husker unit and a wagon elevator, which comprises an auger feed free from support at its end adjacent the wagon elevator, so that a satisfactory discharge of ears from the auger feed will result.

Another object of the invention is the provision of a shield for the front of a tractor carrying corn picker units which will allow easy access to the crank of the engine.

A further object is to provide an improved counterbalancing device for controlling the balance of a corn picker supported from a tractor.

Another object is the provision in a tractor-mounted corn picker with an attached wagon elevator of a device for preventing the lowering of the wagon elevator as the forward end of the picker is moved away from the ground.

Still another object is to provide a beater with the husker of a corn picker for directing the discharge of husks from the husker.

A further object is the provision of a paddle adapted to rotate with the axle of a tractor supporting a corn picker to prevent the entanglement of husks with the axle and any devices attached to the axle.

Another object is the provision of a supporting framework for a corn picker, which will allow the attachment of the picker to tractors of different wheel bases.

Other objects will appear from the disclosure.

According to the present invention, a picking unit, composed of rigidly united gathering and husker units, is mounted in balanced relation over the rear axle of a tractor between one rear wheel and the engine and is supported by a framework which is positioned beneath the rear axle and carried thereby. A second rigid unit, composed of an auger feed device and a wagon elevator, is supported by the husker unit. There may be either one or two picking units positioned over the rear axle. If there is only one unit, the auger feed and wagon elevator are supported not only by the husker but also by a framework which extends from the rear axle of the tractor on the side opposite from which the picker unit is mounted. In a construction where there are two picker units, one on either side of the engine, the auger feed device and wagon elevator are carried by the two husker units of the two picker units. The wagon elevator and auger feed device are detachable as a unit from the picker units. Detachment of this rigid unit allows a simple and easy detachment of the picker units from the axle of the tractor. For this purpose, a jack is placed under the husker unit and the framework, which supports the picker unit, is detached from the axle of the tractor and allowed to drop to the ground. Then, the jack is removed and the tractor driven away from the picker unit, which is left standing on the ground.

In the drawings:

Figure 2 shows a side elevation of the structure of Figure 1 with one wheel of the tractor removed;

Figure 3 shows a rear view of the structure of Figure 1, with the auger feed device and wagon elevator removed;

Figure 4 shows a section taken along the line 4—4 of Figure 3;

Figure 5 shows a section taken along the line 5—5 of Figure 3;

Figure 9 shows a picker unit detached from the tractor;

Figure 10 is a section taken along the line 10—10 of Figure 9;

Figure 8:
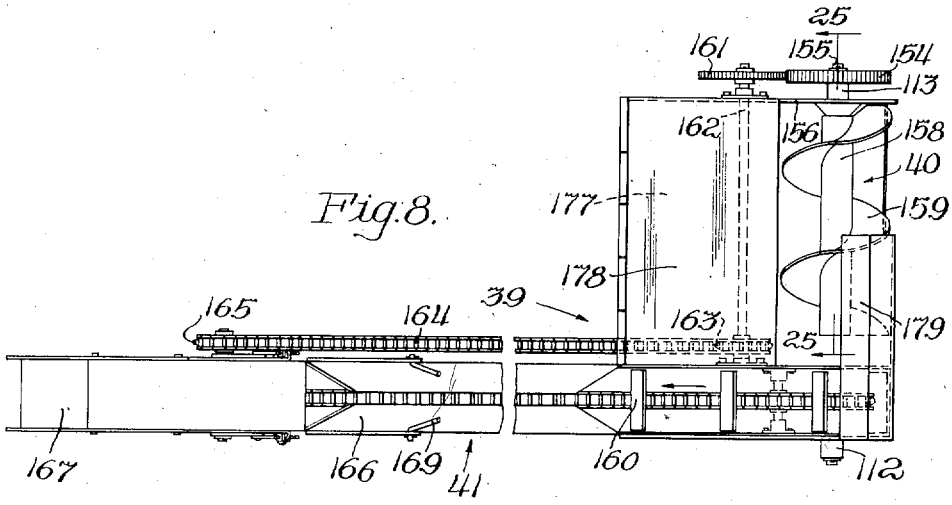
Figure 8 is a detail showing the rigid unit composed of the wagon elevator and auger feed device intended for the construction where there is but a single picker unit mounted on the tractor.
Figures 18, 18A:
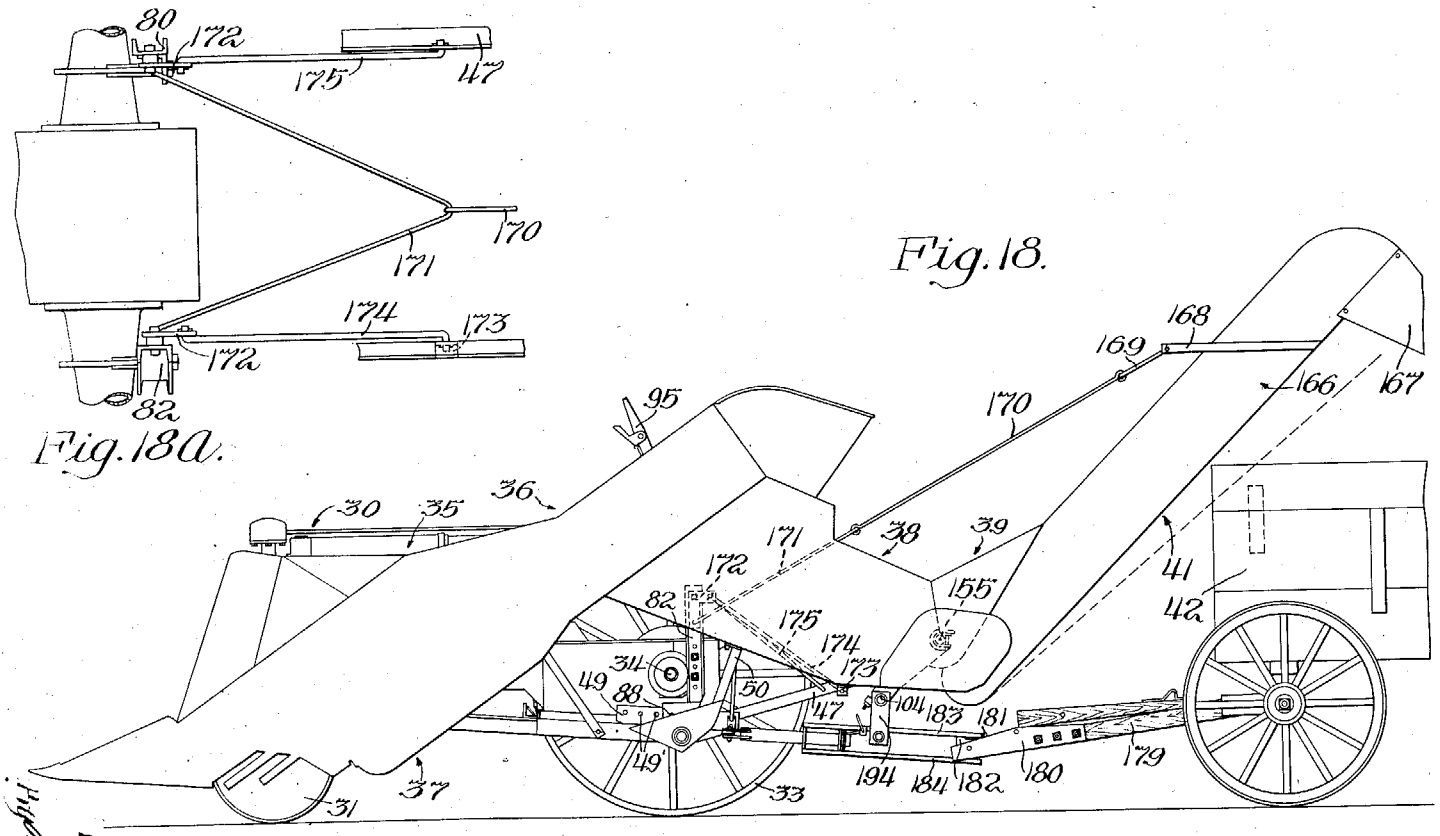
Figure 18 is a side view of the corn picker and tractor with some parts omitted, showing the manner in which raising of the gathering unit effects raising of the wagon elevator.
Figure 19:
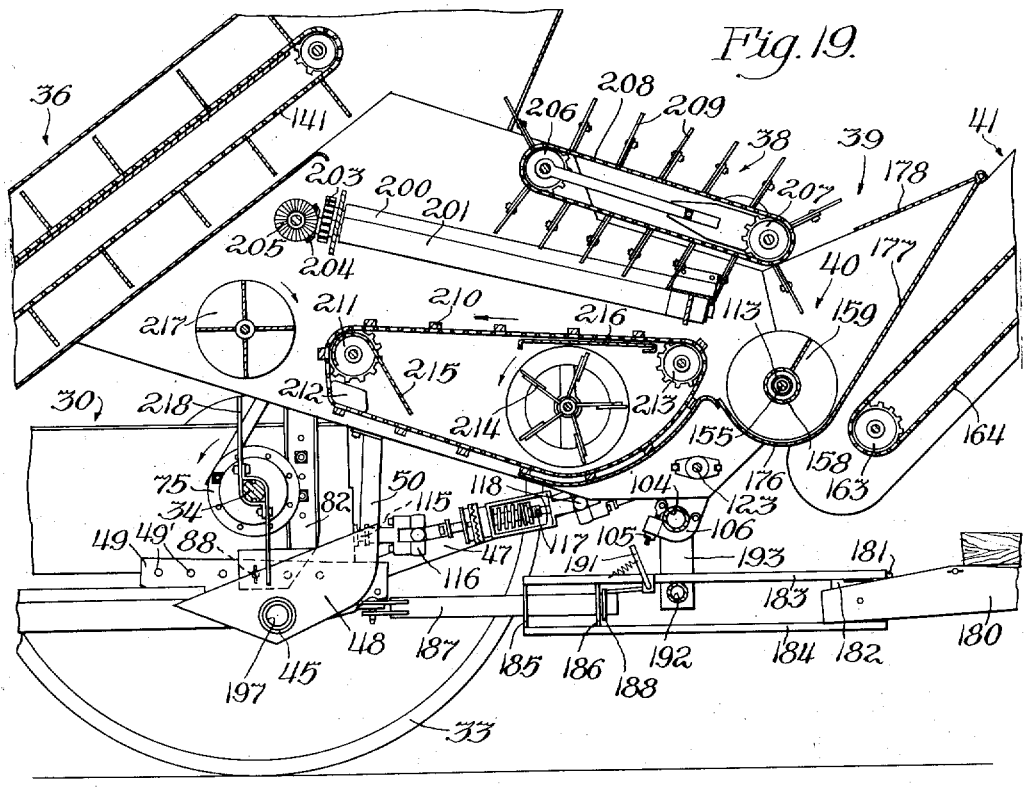
Figure 24:
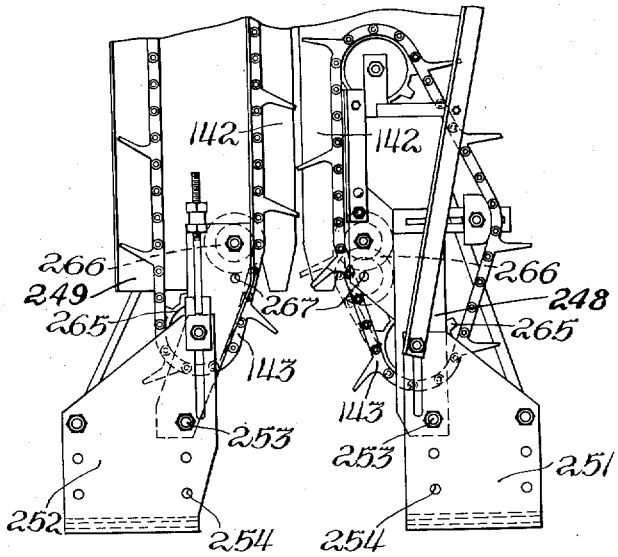
Figure 20:
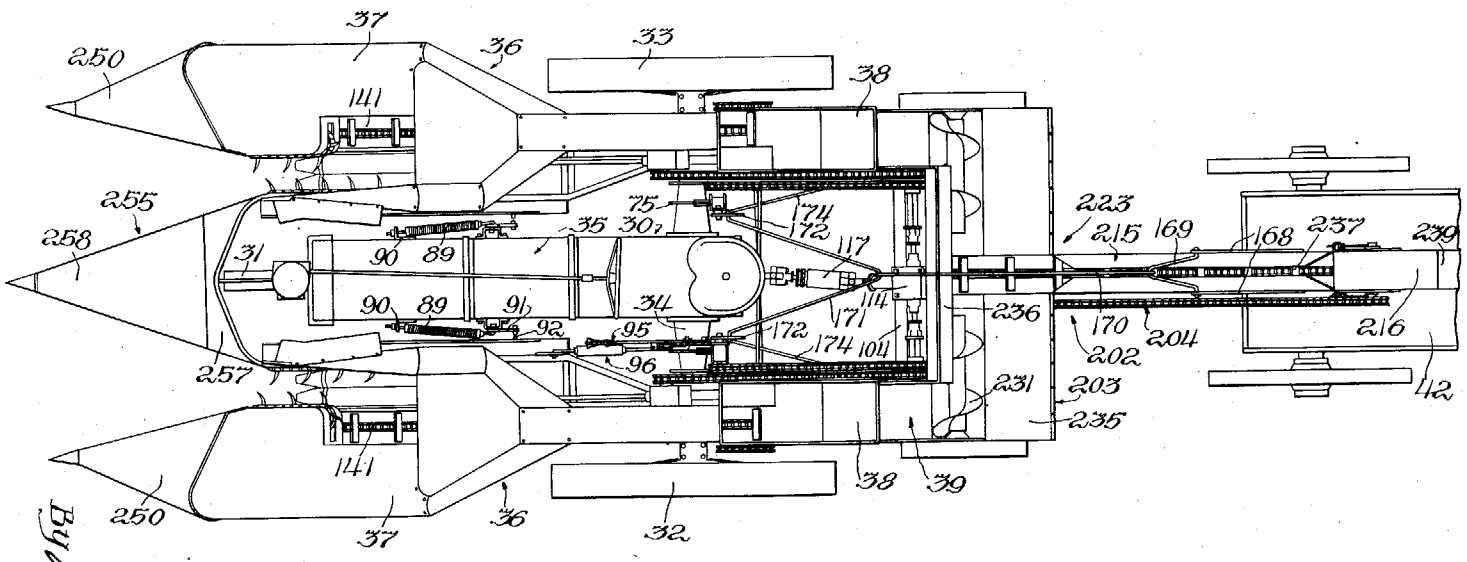
Figure 23:
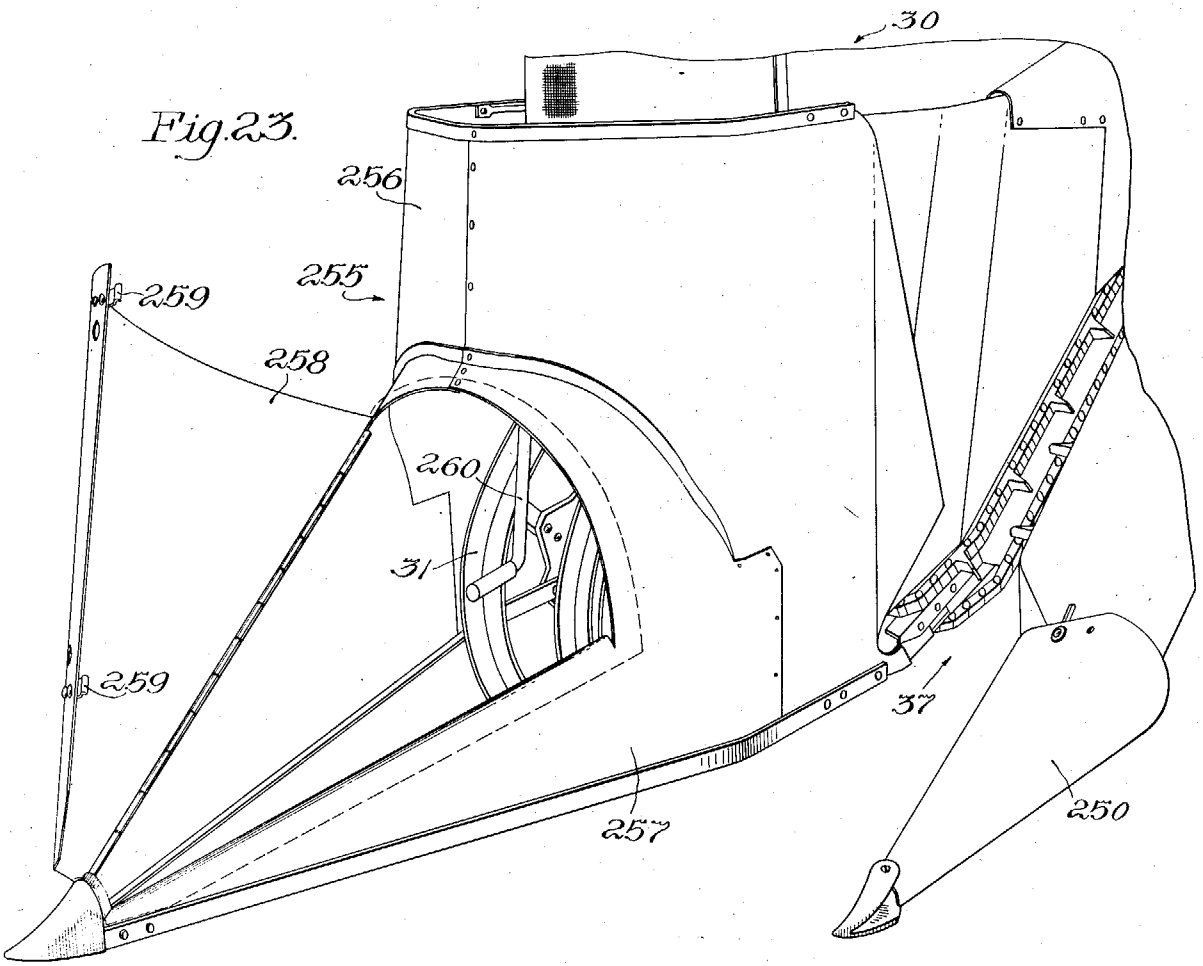

Figure 18*a* is a detail view in plan, showing the connection between the gathering units and wagon elevator;

Figure 19 is a detail showing a beater in a husker unit and a paddle mounted on the rear axle of a tractor adjacent the husker unit;

Figure 20 shows a plan view of a construction wherein there are two picker units mounted on a tractor;

Figure 21 shows a rigid unit composed of wagon elevator and auger feed for use with the construction embodying two picker units on a tractor;

Figure 22 is a detail showing the nose portion of a gathering unit;

Figure 23 is a view in perspective showing the shield for the front of the engine of a tractor;

Figure 24 is a detail showing provision of a longitudinal adjustment of the gathering chain in a gathering unit; and, Figure 25 is a section along line 25—25 of Figure 8, showing the auger feed in detail.

Figure 1:
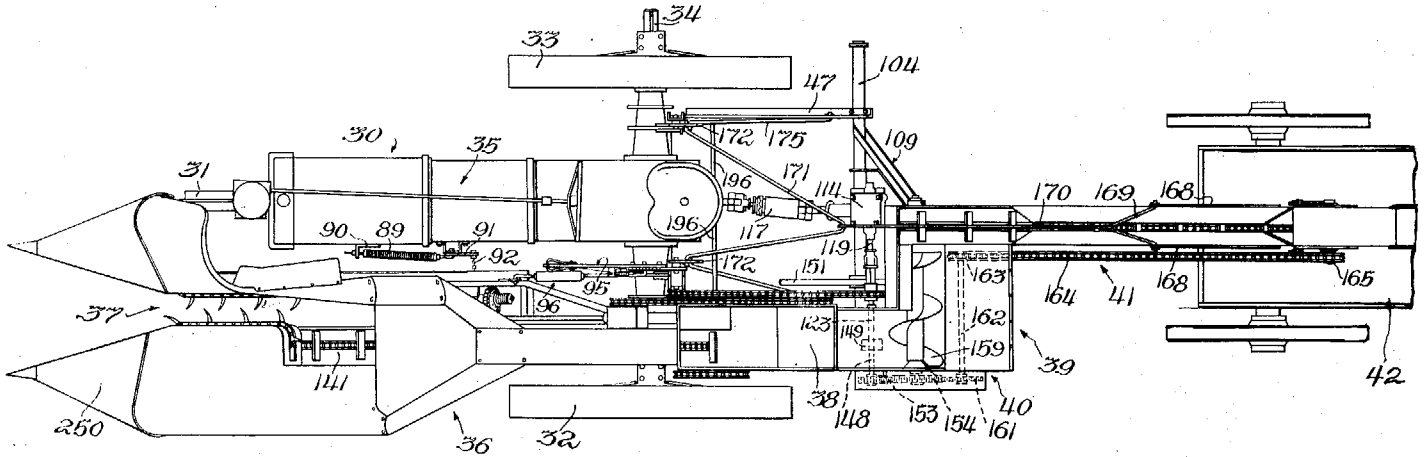
Figure 1 shows a plan view of a tractor with a single picker unit mounted thereon.

As seen in Figures 1 and 2, there is a tractor 30 of the well known tricycle type provided with a front truck 31 and a pair of rear wheels 32 and 33 carried on a rear axle 34 in spaced relation to the tractor body 35. As is to be noted from Figure 1, the rear wheel 32 is spaced a greater distance from the engine than the wheel 33 and, in this larger spacing, a harvester or picker unit 36 is carried. As seen in Figure 2, this picker unit is positioned over the rear axle and is composed of a gathering unit 37 and a hucker unit 38 rigidly attached to one another. Supported at the rear of the husker unit 38 is a second rigid unit 39, comprising an auger feed device 40 and a wagon elevator 41. There is also a wagon 42 attached to the tractor and intended to receive corn from the discharge end of the wagon elevator.

The picker unit 36 is positioned in balanced relation over the rear axle and supported by a framework supported in turn from beneath the rear axle. This framework is shown in detail in Figures 11 and 12 and comprises a cross shaft or transverse pipe 45, a gusset plate 46 rigidly attached thereto at one end having a series of openings 46′, a rearwardly extending member 47 composed of angle iron, a pair of gusset plates 48 and 49 rigidly attached in spaced relation to one another at the opposite end of the transverse pipe, there being a series of openings 49′ in the plate 49, a channel member 50 extending upwardly and rearwardly from between the gusset plates with a small notched end plate 51 at its extremity, as well as a pin 52. There are also angle iron members 53 and 54 attached to the gusset plates 48 and 49, and extending forwardly therefrom. There is a brace 55 extending from the transverse pipe and to one angle iron member 54. A cross-brace 56 in the form of an angle iron extends between the members 53 and 54 and carries within it a small reenforcing plate 57. An angle iron 58 is attached to the cross piece 56 and extends outwardly in partially offset relation to the member 53, and carries at its outer end a small connecting piece 59. At the very extremity of the member 54 there is a notch 60, as well as a hole 61 spaced inwardly from the end a considerable distance. A bracket 65 is rigidly attached to the central portion of the pipe 45 and extends rearwardly thereof.

The manner in which this framework is attached to the picker unit may be seen from Figures 2, 9, 11 and 12. The member 58 is pivotally attached to the gathering unit by means of the connecting piece 59, and the member 54 also is pivotally attached, with the hole 61 in the member 54 receiving a bolt 66, and the notch 60 receiving a bolt 67 slidable in an arcuate slot 68 in the gathering unit. The channel member 50 supports the husker unit 38 with the slotted portion of the plate 51 engaging a bolt 69 attached to the husker unit and the projection 52 engaging an opening 70 in the husker unit. Figure 9 does not show the last mentioned parts in engagement since the picker unit is shown in detached position from the tractor. The method of reaching this detached position will be described later. An angle member 71 and a flat member 72 extend from a pivotal connection with the member 54 and receive in telescoping relation a tubular member 73 attached to the gathering unit. A pin 74 through the tubular member 73 holds the members 71, 72 and 73 in extended relation, as shown in Figure 9, these same members being shown in collapsed position in Figures 2, 11 and 12.

Figure 11:
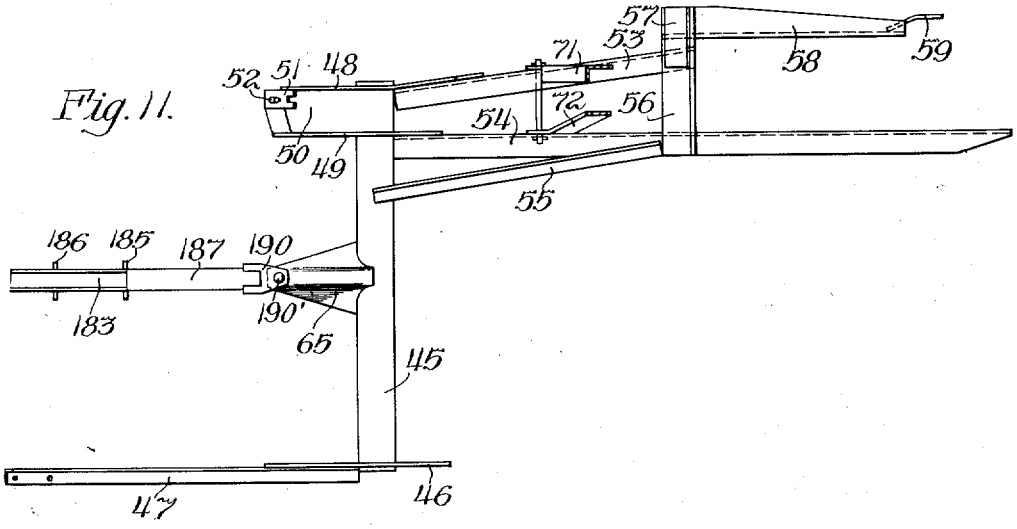
Figure 11 is a detail showing in plan the framework used for supporting a single picking unit on the tractor.
Figure 12:
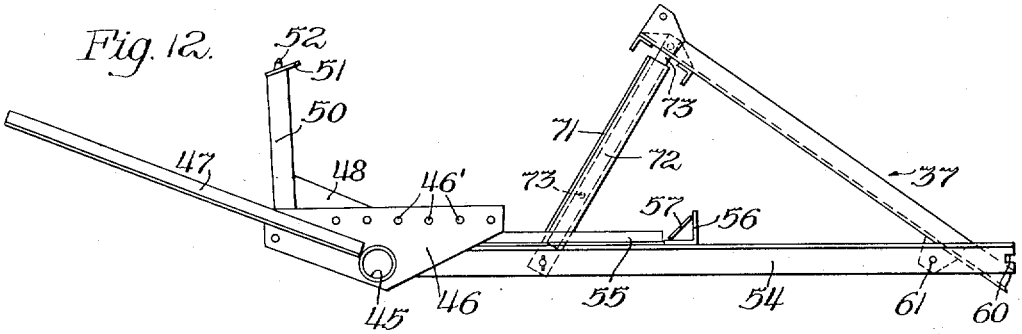
Figure 12 is a side elevation of the same framework.

The frame structure of Figures 11 and 12, along with the picker unit, is supported by means shown in Figures 4, 5, 16 and 17. The rear axle 34 of the tractor carries flanges 75, and, on opposite sides of one of these flanges, a pair of plates 76 is bolted. Between these plates, swinging bolts 77 are mounted. Nuts 79 fit on the ends of the bolts and, by this means, the plate 78 may be held in quick detachable relation to the plates 76, with the bolts 77 sliding into slots 78' in the plate 78. A member 80 is bolted to the plate 78, being of channel shape over the portion which is bolted, and having a U-shaped portion 81 at its lower extremity. This member 80 is attached on the side of the tractor away from the picker unit. On the same side of the tractor as the picker unit and attached in the same fashion, through plates 76, bolts 77 and a plate 78, is a somewhat similar member 82, which is also of channel shape throughout the major portion of its length, and has a U-shaped portion 83 at its lower extremity. There are openings 84 in the U-shaped portions 81 and 83.

Figures 4 and 5 are sections showing details of the plates 78. Figure 4 shows the plate 78 on the same side of the tractor as the corn picker unit. This plate has an upper flange 86, which engages the plates 76. Figure 5 shows the plate 78 on the opposite side of the tractor, and this plate has a flange 87, which engages the under side of the plates 76. These flanges 86 and 87 will tend to counteract the tipping effect produced because there is a picker unit mounted on one side of the tractor and none on the other.

In attached position, the framework is carried beneath the rear axle of the tractor with the cross shaft or transverse pipe 45 paralleling it. The plates 46 and 49 of the framework (Figures 11 and 12) fit, respectively, within the U-shaped portions 81 and 83 of the members 80 and 82 (Figures 16 and 17) with the proper holes 46' and 49' opposite the holes 84. Pins 88, as shown in Figures 2, 5 and 9, fit through the openings and allow the framework with the picker unit thereon to be swingably supported from beneath the axle of the tractor.

As previously stated, the picker unit is supported in balanced relation. As seen in Figure 2, a spring 89, which counteracts any slight unbalance, is connected at one end, as at 90, to the tractor frame, and at its other end to one end of a bell crank 91 pivoted on the tractor frame. The other end of the bell crank is connected to the angle member 54 of the framework supporting the gathering unit by means of a chain 92.

As previously stated in the description of the framework of Figures 11 and 12, there is a series of openings 46' and 49' in the gusset plates 46 and 49. By this arrangement, tractors of different wheel bases may be accommodated. If the distance between the rear axle 34 and the front wheels 31 is great, then the pins 88, supporting the framework from the tractor, will be inserted in the openings 46' and 49' toward the rear of the gusset plates 46 and 49. Thus, the front end of the gathering unit is kept ahead of the front wheels of the tractor. If the distance between the rear axle and the front wheels is small, the pins 88 are inserted in the openings 46' and 49' toward the front of the gusset plates 46 and 49.

Figure 16:
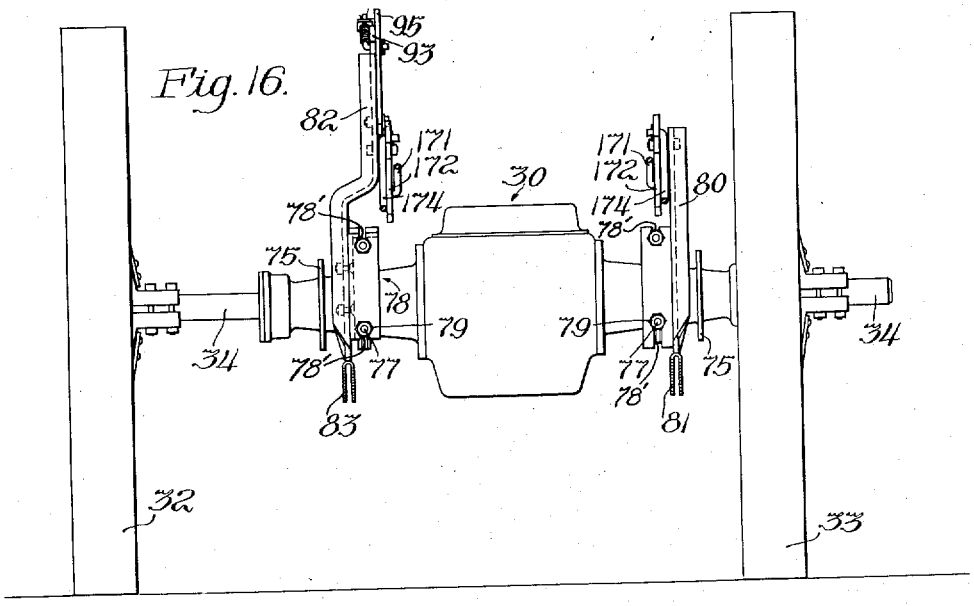
Figure 16 is a view taken from the rear of the tractor and showing the device attached to the rear axle of a tractor for carrying the framework supporting a single picker unit.
Figure 17:
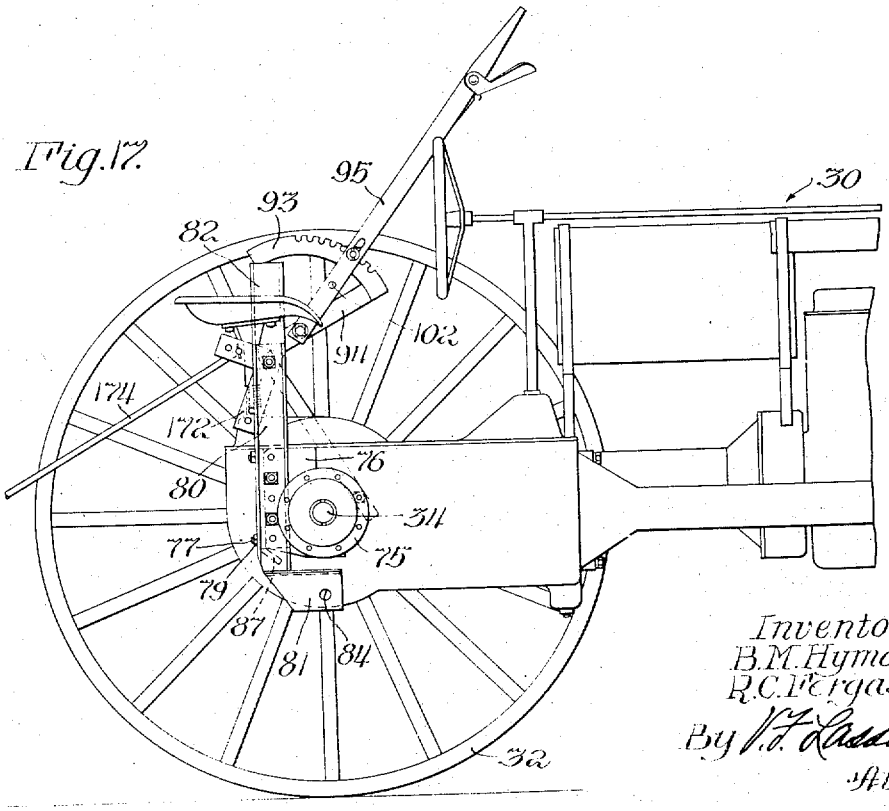
Figure 17 is another view of the same structure taken from the side of the tractor.

The means for adjusting the position of the gathering unit with respect to the ground is shown in Figures 9, 16 and 17. A notched arcuate member 93 is attached to the member 82 by means of a connecting piece 94. A lever 95 is pivoted on the piece 94 and arranged to swing about the same center as that of the arcuate member 93, and has a detent which fits in any of the notches of the arcuate member, which detent is controllable from the handle of the lever. As seen in Figure 9, there is a connecting link 96 composed of a bolt 97 adjustably fixed to a square hollow member 98 carrying a nut 99 within it threaded to the bolt 97. A rod 100 is attached to the gathering unit at one end and yieldingly attached to the square hollow member by means of a spring 101. Thus, it will be seen that the link 96 is made yielding by virtue of the spring 101 and adjustable in length by means of the nut 99. One end of the bolt 97 fits in an opening 102 in the lever 95. Thus, it will be seen that the link 96 connects the lever 95 and the gathering unit, and changing of the position of the lever effects, by means of the link, a change in position of the gathering unit with respect to the ground.

Figure 6:
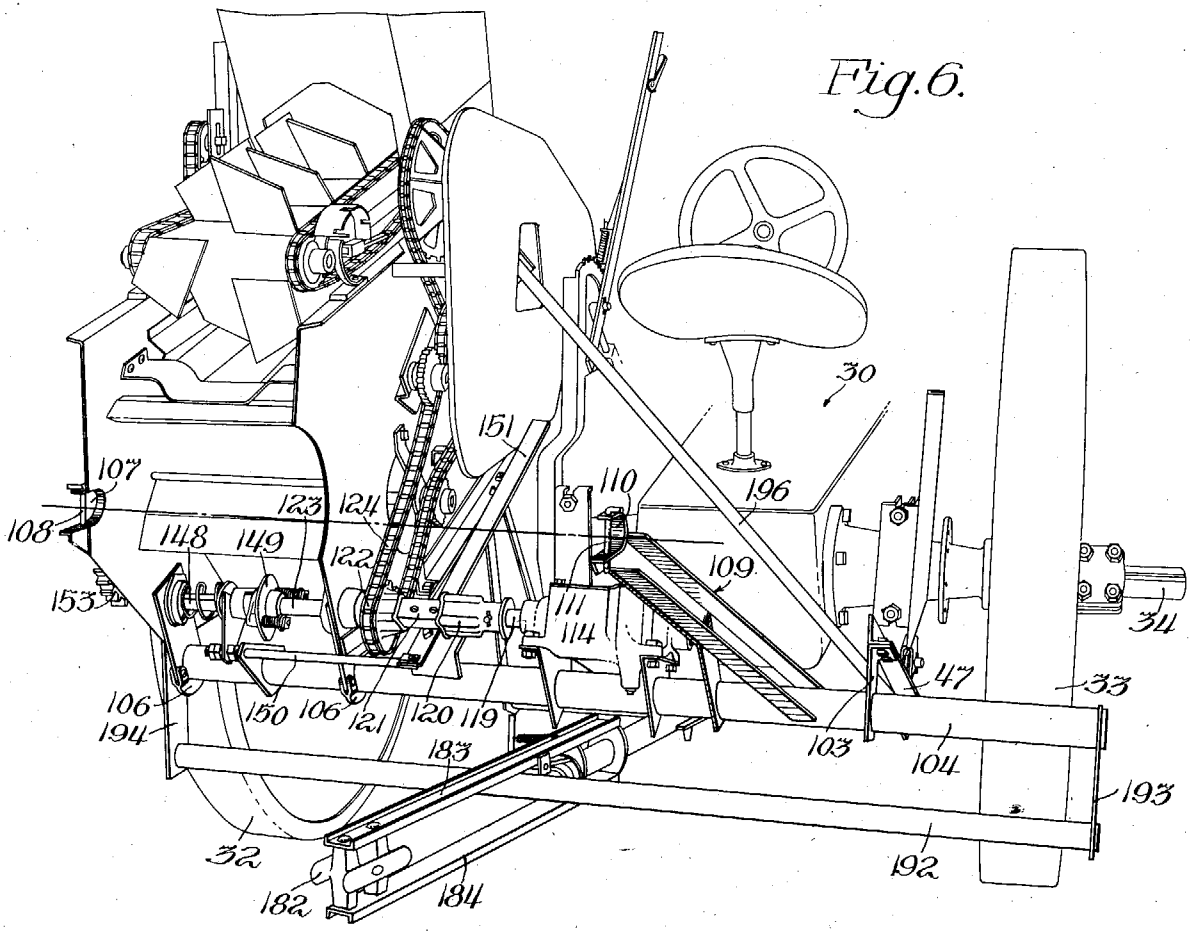
Figure 6 is a view generally similar to that of Figure 3, but taken in perspective and intended to show the manner in which the auger feed device and wagon elevator are supported by the husker unit.

As shown in Figures 5, 6, 11 and 12, there is a member 47 extending rearwardly from the transverse pipe 45. This member 47 carries at its extremity a bracket 103 (Figure 6), which supports one end of a cross pipe 104 at the rear of the tractor. The opposite end of the pipe is supported by the lower part of the husker unit in a pair of swinging bolts and yoke members 105 and 106. As previously stated, a rigid unit 39 composed of an auger feed device 40 and a wagon elevator 41 is supported by the husking unit 38. This supporting is effected by means of a slotted portion 107 in the husker, as well as a locking pin 108, which fits across the slot. This is best seen in Figure 6. A bracket member 109 extends from the cross pipe 104 adjacent its point of support by the member 47, and carries at its outer end a supporting yoke 110 of substantially the same shape as the slotted portion 107 in the husker unit and in alinement therewith, as shown in Figure 6. There is a locking pin 111 positioned in the supporting yoke similar to the locking pin 108. The auger feed device and wagon elevator, as shown in Figure 8, are supported by these parts with a bearing member 112 fitting in the supporting yoke 110 and a bearing sleeve 113 fitting in the slotted portion 107. The axis of the auger feed device coincides with the heavy center line (Figure 6) extending between the slotted portion 107 and the yoke 110.

Figure 7:
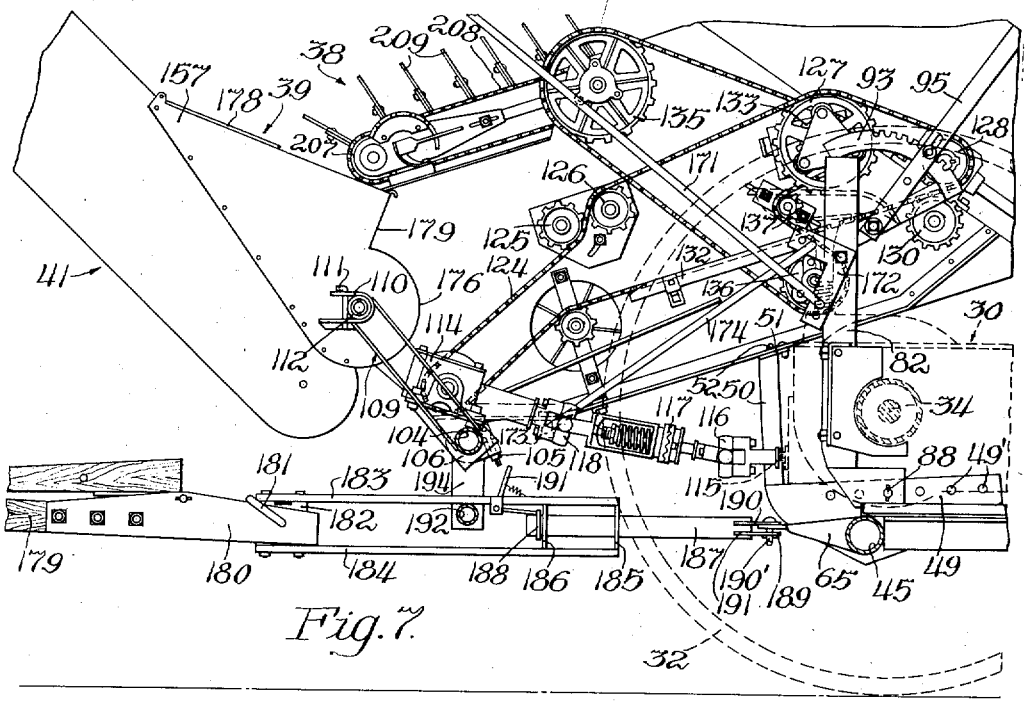
Figure 7 is a side view showing in detail the husker unit and the manner in which the picker unit is supported from the tractor.

The cross pipe or shaft 104, in addition to forming means for aiding the support of the auger feed device and the wagon elevator, supports a gear-box 114. This gear-box is connected with a power take-off shaft 115 of the tractor through a universal joint 116, slip clutch 117, and a second universal joint 118, as seen in Figure 7. As seen in Figures 3 and 6, a stub shaft 119 extends from the gear-box parallel to the cross pipe 104. Attached to the shaft 119 is a sleeve member 120 having a square section which receives in telescoping relation a sleeve 121, also of square section. This sleeve fits into a square opening in a gear member 122 attached to a shaft 123 carried by the husker unit. The sleeve 121 is held in fixed relation to the sleeve 120 by means of a pin, and, for detachment, the pin is removed and the sleeve slid out of engagement with the opening in the gear 122. By means of the described parts connection is established between the power take-off shaft and the gear 122.

As seen in Figure 9, drive of the husker unit and gathering unit is effected by means of this gear. A sprocket chain 124 is driven by the gear 122, which chain, in turn, drives tightener gears 125 and 126, a gear 127 driving the husking rolls of the husker unit, a gear 128 driving the gathering rolls through a shaft 129, a gear 130 driving a beater within the husker unit, and a gear 131 driving a fan, also within the husker unit. The portion of the chain extending between the gears 130 and 131 passes over a guide member 132. A gear 133, keyed to the same shaft as the gear 127 for the husking rolls, is a driver for a chain 134, which drives a gear 135 for the ear forwarder of the husking unit, a gear 136 driving the husk conveyer in the husking unit and a tightener gear 137. As seen in Figure 2, there is a gear 138 keyed to the same shaft as the gear 135 but located on the opposite side of the husker. This gear 138, by means of a chain 139, drives a gear 140, which, in turn, drives an elevator 141 (Figure 1) serving to carry the ears from the snapping rolls to the husker unit. The shaft 129 (Figure 9) drives snapping rolls 142 and, in addition, gathering chains 143, through gears 144, 145 and 146, and a chain within a housing 147.

The driving of the auger feed device and the wagon elevator is effected by means of the shaft 123, as shown in Figure 1. Reference is also made to Figures 2, 3, 6 and 8. This shaft 123 (Figures 3 and 6) drives a shaft 148 through a slip clutch 149 controllable by the operator through a link 150 and lever 151. The shaft 148 drives a gear 152 supported on it, which, in turn, drives a gear 153. The gear 153 (Figure 2) meshes with a gear 154 fixed to a shaft 155 (Figures 8 and 25) of the auger feed. This shaft 155 (Figure 25) is supported entirely from one end through the bearing sleeve 113, which extends over a considerable portion of the shaft and is itself supported by the plate 156 with the aid of a conical member 157 in welded connections. The shaft 155 is adapted to rotate within roller bearings 113′ in the ends of the sleeve 113.

There is a sleeve 158 surrounding the shaft 155 and bearing sleeve 113 and connected to the shaft 155 through welded plate connections 158′. A helical fin 159 is welded to the sleeve 158. These last two parts constitute the auger feed proper. As seen in Figure 19, which among other things shows a section through the auger feed device, a trough 176 partially surrounds the auger feed proper, and there are a flat portion 177 extending upwardly and rearwardly from the trough and a flat shield portion 178 extending back over the auger feed proper. These parts constitute a reservoir or hopper for the corn when the auger feed and wagon elevator are not operating. A flat part 179 (Figures 7 and 8) extends upwardly from the trough over the auger feed proper for the width of the auger feed, which does not come opposite the husker. The wagon elevator 39 has a conveyer mechanism 160 driven by the gear 154 through a gear 161, shaft 162, gear 163, sprocket chain 164, and gear 165. The conveyer mechanism 160 is carried within a housing 166 open at its upper side except over a portion connected to a discharge spout 167. From the foregoing description, it is apparent how the gathering unit, the husking unit, the auger feed, and the wagon elevator are driven from the power take-off 115 through the gear-box 114.

In operation, the corn picker is moved over the ground in a position as shown in Figure 2. When turns are made, however, it is necessary to raise the gathering unit, as shown in Figure 18. The natural effect of this would be to lower the wagon elevator to the dotted line position, if the wagon elevator and gathering unit were fixed with respect to one another. Lowering of the wagon elevator on turns would mean that the elevator casing 166 and the spout 167 might strike the wagon. In order that this may be avoided, a special form of control mechanism for the wagon elevator has been devised. The operation of this mechanism may be seen from Figures 18 and 18*a*. Supporting pieces 168 connected to the elevator casing 166 carry a bail member 169. A link 170 connects the bail member and a bent link 171 fastened at its ends to corresponding ends of bell cranks 172 pivotally mounted on the members 80 and 82 carried by the rear axle 34 of the tractor. The opposite end of the bell crank 172, on the same side of the tractor as the picker unit, is connected to a bracket member 173 on the under side of the husker unit, by means of a link 174. The corresponding end of the bell crank 172, supported on the member 80 on the opposite side of the tractor, is connected to the member 47 of the supporting framework by means of a link 175. From this description and from Figure 18, it will be apparent that, as the picker unit moves away from the ground in a clockwise direction (Figure 18), the husker unit and the member 47 move toward the ground, pulling one arm of the bell cranks down in a clockwise direction, and the other arm of the bell cranks will also be moved in a clockwise direction. Consequently, the wagon elevator is moved away from the ground, pivoting about the shaft 155 of the auger feed. It may happen that, through the arrangement shown, an upward movement of the gathering unit will produce only a very slight upward movement of the wagon elevator, or the lengths of the arms of the bell crank may be varied so that a considerable upward movement of the wagon elevator is effected. In any event, the important thing is that there be no substantial downward movement of the wagon elevator, so that neither the elevator casing nor the discharge spout strikes the wagon on turns.

Figure 13:
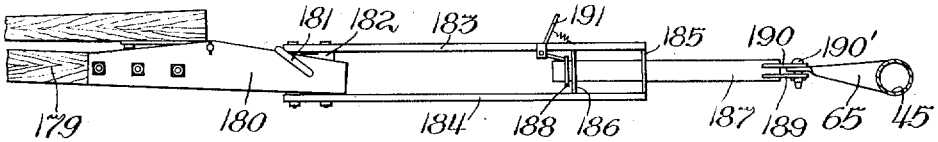
Figure 13 is a detail showing the manner in which a wagon for receiving corn from the picker is attached to the tractor.

The wagon 42, drawn behind the tractor, has a folding tongue 179 (Figures 7 and 13) clamped between plates 180. A casting 182 is held between these plates by means of a U-shaped pin 181 and has members 183 and 184 clamped to its upper and lower sides. Spaced plates 185 and 186 are fixed between the members 183 and 184 near their ends. A tubular member 187, carrying a limiting flange 188 at one end, extends through openings in the plates 185 and 186, and has attached to its other end spaced pieces 189 and 190, which receive an end of the bracket 65 attached to the transverse pipe 45 of the supporting framework for the picker unit. A pin 190' holds the bracket 65 between the pieces 189 and 190. A control member 191 in the form of a bell crank is pivoted on the member 183 and is held by a spring against the tubular member 187. The members 183 and 184 and tubular member 187 are supported by a pipe 192 carried beneath the cross pipe 104 by supporting members 193 and 194 (Figures 3 and 6). The parts 182 to 191 and bracket 65 constitute the wagon hitch proper. If, for example, the wagon is to be attached to the tractor, the tractor is brought into as nearly close to proper position as possible to the wagon tongue. If the casting 182 is not far enough forward to go between the plates 181, then the control member 191 may be pushed back out of contact with the pipe 187 and stop flange 188. Then, the members 183 and 184 with the casting 182 may be slid forwardly with respect to the tractor and into proper relationship with respect to the plates 181, and the casting and plates will be attached. When the tractor moves forwardly, the control lever 191 will snap back into the position shown in Figure 7.

The detaching of the picker unit from the tractor will now be described. The unit 39 (Figure 8), comprising the wagon elevator and auger feed device, is released by removal of the pins 108 and 111 and sliding of the unit out of the slot 107 and supporting yoke 110 (Figures 3 and 6). Then, the link 96 (Figure 9) is disconnected from the tilting lever 95 (Figure 17). A jack 195 (Figure 9) is placed under the husker unit. The pin 190' (Figures 7 and 13) connecting the bracket 66 and the pieces 189 and 190, and the pin 181 holding the casting 182 between the plates 180 are knocked out for disengagement of the wagon hitch. The counterbalancing chain 92 (Figure 2) is disconnected from the member 54 of the supporting framework. The square sleeve 121 (Figures 3 and 6), engaging the square opening in the gear 122, is slid out of engagement with the gear, and then the bracket 103 supporting the cross pipe 104 is disconnected from the member 47; next, the cross pipe 104 is removed from the husker unit by disengagement of the bolts 105 from the yoke members 106. A cross brace 196 (Figures 3 and 6), connecting the husker unit and the member 47, is removed. Then, the supporting pins 88 are knocked out of the plates 46 and 49 (Figures 11 and 12) and the U-portions 81 and 83 (Figures 16 and 17), of the members 80 and 82. Then, the slotted plate 51 and projection 52 of the member 50 are removed from engagement with the bolt 69 and opening 70 in the husker unit (Figure 9), and the supporting framework for the husker unit is allowed to drop to the ground with the member 54 pivoting about the bolt 66, which connects the member 54 to the gathering unit and the bolt 67 sliding in the arcuate slot 68. The pins 88 are replaced in the plates 46 and 49. Then, a pipe 197 is slipped partially within the transverse pipe 45, as shown in Figure 10, and supported upon a block 198. This pipe prevents tipping of the picker unit when free of the tractor. Then, the jack 195 is caused to raise the husker unit sufficiently, so that the ends of the members 71 and 72 come opposite an opening in the tube 73. The pin 74 is slipped into the opening and the telescoping members are held in fixed position. Then, the jack is removed, the weight of the picker unit being carried on the framework through the members 71, 72 and 73 and pin 74, tipping being prevented by the pipe 197 and block 198. The tractor is now backed away from the picker unit with only the front wheels 31 passing over the transverse pipe 45. The unit is now in the position shown in Figure 9, except that the jack is shown under the husker unit in this figure. When the picker unit is to be attached again to the tractor, the above procedure is reversed.

From the foregoing description it will be seen that the removal or attachment of the corn picker is comparatively simple and easy. Except for the removal of the rigid unit 39, comprising the wagon elevator and auger feed device, one man may carry out the entire procedure. The operations are simple and easy to perform, and, when removal is effected, the picker unit, comprising gathering and husker units, rests as a stable and steady unit upon the ground. From this position, reattachment of the picker unit is just as easy as detachment was.

A description has already been given of the various gears and chains on the outside of the husker unit for driving the husker unit. Attention is now directed to Figure 19, which shows a section through the husker unit. There are sets of staggered husker rolls 200 and 201, of conventional form, driven by gears 203 and 204 and gear 205, coaxially mounted with gear 127 (Figure 9). Over the rolls there is an ear retarder composed of a driving gear 206 coaxially mounted with gear 135 (Figure 9), a second gear 207, a sprocket chain 208, and ear retarder flaps 209 secured to the chain. Beneath the husker rolls there is a husk conveyer 210 driven by gear 211, coaxially mounted with gear 136 (Figure 9). There is an adjustable block 212 below the gear 211, as well as a rear gear 213. A fan 214 is within the husk conveyer and is coaxially mounted with the gear 131 (Figure 9). A shield 215 protects the shaft of the gear 211 from the fan. A shield 216 protects the conveyer.

In operation, ears of corn are discharged by the elevator 141 onto the husking rolls 200 and 201. They pass the length of the rolls, being retarded by the flaps 209, and stripped of husks, and fall into the auger feed device 40. The husks fall onto the husk conveyer, which moves them forwardly, as shown by the arrow. They would normally fall from the front end of the conveyer upon the axle 34 and become entangled in the devices which support the picker unit from the axle. In order that this may be avoided, a beater 217, coaxially mounted with gear 130 (Figure 9), has been provided. This rotates in the direction indicated by the arrow and causes the husks leaving the conveyer to fall straight down and in back of the axle 34 and the supporting devices thereon for the picker unit. Where there is no axle housing over a portion of the axle, as shown in Figure 19, a paddle 218 may be attached to the axle so as to rotate with it. The paddle serves to keep the axle and supporting devices free of husks and may be employed either with or instead of the beater. The fan 214 serves to keep the conveyer 210 from becoming clogged with husks.

The description up to this point has been only of a one-row machine, that is, a tractor with but a single picker unit mounted thereon. Figure 20 shows in plan a tractor with two picker units mounted thereon. The picker units 36 are the same as those shown in Figure 1 and are mounted on opposite sides of the tractor engine, between the rear wheels. In this case, however, a slightly modified form of rigid unit 223, composed of an auger feed device 224 and wagon elevator 225, is employed. This is shown in Figure 21. As part of the auger feed device 224, there are a pair of shafts 226 carried within a pair of bearing sleeves 227 supported in side plates 228 with the aid of conical members 229, a pair of sleeves 230 around the shafts 226 and bearing sleeves 227, and helical elements 231 around the sleeves. This arrangement of parts is similar to that shown in Figures 8 and 25 for the one-row model. The pairs of helical elements 231 and sleeves constitute the auger feed proper. A pair of troughs 233 partially surround the auger feed proper and have portions 234 on either side of the wagon elevator extending upwardly and rearwardly, and cover portions 235 extending forwardly like the portion 178 (Figures 8 and 19) for the one-row model. There is also a portion 236 extending upwardly from the trough 212 over the auger feed, like the portion 179 (Figure 7) for the one-row model. The wagon elevator 225 has a conveyor mechanism 237 extending rearwardly and centrally from the auger feed device within a casing 238. There is a discharge spout 239 similar to the spout 167 of the wagon elevator for the one-row model. The auger feed device and wagon elevator are supported as a unit in a manner similar to that described for the one-row model, except that the entire support is through the husker units rather than through one husker unit and a brace extending from the supporting structure for the picker unit. The bearing sleeves 227 are carried within slots in the husker units, similar to the slot 187 shown in Figure 9 for the one-row model. There are gears 242 fixed to the shafts 226 and meshing with gears corresponding to the gear 151 shown in Figure 2, for the one-row model, and driven from a gear-box connected to the power take-off shaft. Driving of the wagon elevator is effected through a gear 243 in mesh with one of the gears 242, a shaft 244, gear 245, chain 246, and gear 247.

In the two-row model, driving of the husker units and the auger feed device and wagon elevator is effected by the power take-off shaft through a gear-box similar to the gear-box 114 (Figure 6) for the one-row model. In this gear-box, however, there are two stub shafts corresponding to the single stub shaft 119 for connection to the two picker units. The gear-box is also supported on a pipe similar to the cross pipe 104 of the one-row model, which is, however, supported at both ends by husker units rather than at one end by the member 47 of the framework for the picker unit.

Figure 14:
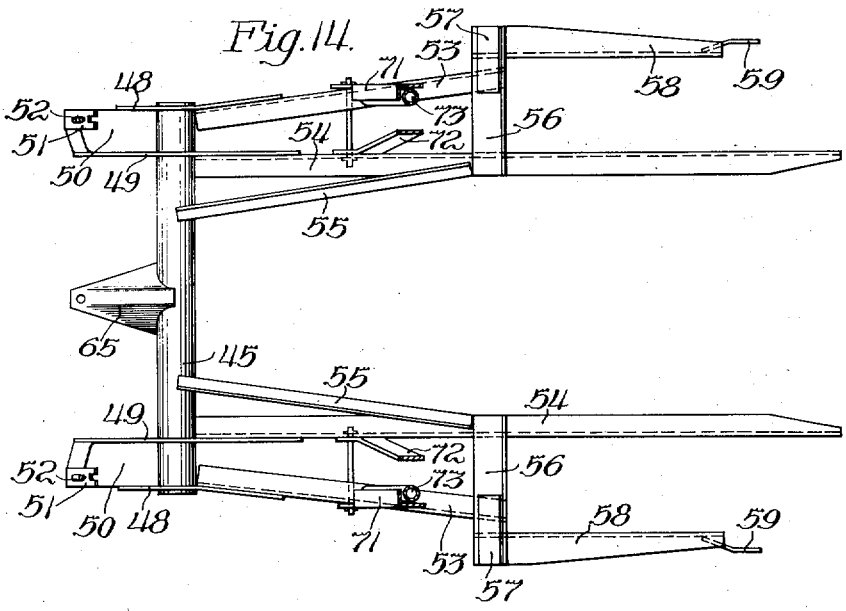
Figure 14 is a plan view of the framework employed for supporting a pair of picker units from the tractor.
Figure 15:
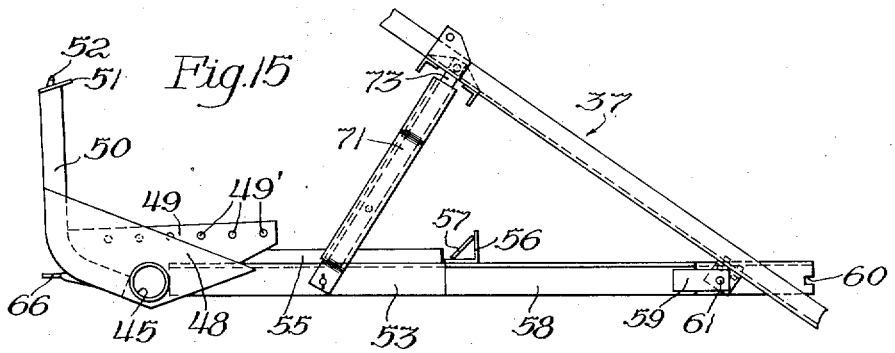
Figure 15 shows in side elevation the manner in which the framework is attached to the picker unit.

The framework for the two-row model is shown in Figures 14 and 15, and it will be seen from a comparison of Figures 11 and 12 that the two frameworks are similar, except that both ends of the transverse pipe carry structures like that connecting the pipe and the picker unit in the one-row model. There are at each end of the transverse pipe 45 plates 48 and plates 49 spaced inwardly therefrom, having a series of openings 49', angle members 53 and 54, bracing pieces 55, 56 and 57, and angle member 58, connecting piece 59, and a channel member 50, with a slotted plate 51 and projection 52. The members 54 have slots 60 at one end and openings 61 spaced from the end. The framework is carried beneath the rear axle of the tractor by means of pins 88 extending through the proper holes 49' of the plates 49 and through attachments to the rear axle of the tractor, very similar to those shown in Figures 16 and 17 for the one-row model.

In the two-row model, raising of the wagon elevator is effected in the same manner as in the one-row model. Just as in the one-row model, connecting pieces 168 extend from the elevator casing 215. A bail 169 is fastened to the connecting pieces and to a link 170, which extends down to a bent link 171. The bent link is connected at its ends to bell-cranks similar to the bell-cranks 172 shown in Figure 18. There are also links extending from the bell-cranks similar to the links 174, both of them being connected to the husker units rather than one to the supporting framework for the picker units, as is the case with the one-row model.

Detachment of the pair of picker units of the two-row model from the tractor is effected in substantially the same way as with the one-row model. The unit comprising the wagon elevator and auger feed device is removed from its connection with the husker units; then, the tilting lever for the picker units is disconnected; counterbalancing chains are disconnected; jacks are placed under the husker units; then, the stub shafts extending from the gear-box are disconnected from the husker units; then, cross braces, similar to the cross brace 196 for the one-row model shown in Figure 3, are removed; the wagon hitch is disconnected from the wagon; the cross pipe supporting the gear-box is disconnected from the husker units; the pins 88 supporting the picker units and the framework are knocked out; the counterbalancing springs are removed; the slotted plate 51 and projection 52 of the channel member 50 for supporting the husker units are disengaged from the husker units, and the framework is allowed to drop to the ground; then, the jacks supporting the husker units are raised until the telescoping members 71, 72 and 73 reach the position where the pin 74 may be slipped in the opening in the member 73, as shown for the one-row model on Figure 9; then, the jacks are removed and the tractor is backed out from under the picker units, the front wheels passing over the transverse pipe 45. The picker units are now in the position shown for the one-row model in Figure 9.

Figure 22 shows a detail of the divider point suitable for the gathering unit 37 on either the one-row or the two-row model. There is a nose portion 250 at the end of the gathering unit connected thereto by means of a plate 251 in engagement with a plate 248 as part of the gathering unit by means of bolts 253. Snapping rolls 142 are shown in dotted lines. The bolts 253, which clamp the plates 251 and 248 against one another, extend through openings 254 in the plates (Figure 24). Adjustment of the nose 250 with respect to the gathering unit is effected by change in relative position of the plates 251 and 248, so that there is a registration of different openings in the plates. Similar adjustment may be had of shield 257 by shifting of plate 252 with respect to the plate 249. This in effect adjusts the position of the snapping rolls with respect to the ground.

Figure 23 shows a novel form of shield 255 for the engine of the tractor. This is composed of a substantially cylindrical portion 256 and a conical nose portion 257 extending forwardly from the tractor and along the ground in a manner similar to the gathering points of the gathering units. There is a door 258 in the nose portion and of the same general shape, so that in a closed position it will have the same contour as the nose portion. It is held in closed position by clips 259. By this construction access is had to a crank 260 for starting the engine. It is shown only in connection with the two-row model, but it will be apparent that it may be applied to the one-row model, if it is found necessary to extend the shield around the engine so far that access could not otherwise be had to the crank.

Figure 24 shows a detail of the point of a gathering unit. Snapping rolls 142 are positioned in side-by-side relation and gathering chains 143 in the form of closed loops, only one end of which is shown, extend on opposite sides of and beyond the ends of the snapping rolls. There are idler sprockets 265 at the end of the gathering chain loops. Adjacent the ends of the snapping rolls and within the loops are rollers 266 mounted in one set of holes 267 in plates 249 and 268 to plate 248. The rollers may be moved longitudinally of the snapping rolls by a change of position to the other set of holes 267, so that the gathering chains occupy the position shown in dotted lines. In this manner, the length of the chain parallel to the snapping rolls may be varied, and the position of the lower ends of the snapping rolls is varied with respect to the end of the parallel parts of the gathering chains.

The operation of both the one-row model and the two-row model is substantially the same. The tractor is driven over the ground, so that a picker unit passes over a row of corn. The ears are snapped from the stalks as the stalks pass between the snappings rolls 142. The ears then pass up the conveyer 141 into the husker unit 38. The husked ears leave the husker unit and enter the auger feed device by which they are fed to the wagon elevator 41. They then pass up the wagon elevator and drop into the wagon. Where there are two picker units on the tractor, each picker unit must pass over a row of corn. Husked corn enters at each end of the auger feed device 203 from the husker units and is fed by the device towards its center, from which point it is conveyed by the wagon elevator to the wagon. When a turn is to be made, the wagon elevator swings away from a position at which it discharges into the wagon and consequently drive of the auger feed and the wagon elevator must be stopped. This is done by disengagement of clutch 149 by means of lever 151 (Figures 3 and 6). However, operation of the husker unit still continues and ears of corn are discharged from the husker unit and may be retained in the reservoir formed at the rear of the auger feed proper until the turn is completed and operation of the auger feed device and wagon elevator is resumed.

In this connection, the auger feed device, which connects the husker unit and the wagon elevator in both one-row and two-row models is worthy of special mention. An auger feed, simply as a positive feeding mechanism, is a distinct improvement over the ordinary chute or gravity feed between husker unit and wagon elevator. In the latter construction, the bottom of the wagon elevator must be below the discharge outlet of the husker unit, whereas a positive feed allows the bottom of the wagon elevator to be at least as high as the discharge opening of the husker unit. Furthermore, with a positive feeding mechanism, such as an auger feed, there may be a reservoir in connection therewith functioning as referred to in the preceding paragraph. This is of advantage, since, with a chute or gravity feed connecting the husker unit and wagon elevator, a stopping of the wagon elevator would cause the ears of corn to pile up at the base of the wagon elevator, and jamming might result on starting. The auger feed is also of distinct advantage over some other types of feeding mechanism, such as a belt conveyer. With the belt conveyer there is some possibility that the ears may jam the conveyer at the end where the wagon elevator is connected. With the type of auger feed shown, however, the ears are discharged more positively and the danger of jamming is eliminated, since the end of the auger feed adjacent the wagon elevator is free and unsupported. Another advantage of the auger feed over a belt feed is that the driving of the auger feed and wagon elevator from the drive shaft, which runs the gathering and husker units, is direct and simple. As seen in Figures 2, 3 and 8, shaft 155 of the auger feed device 40 is driven through gears 153 and 154 by gear 152, which is in direct line and driven by stub shaft 119 of the gear-box 114. The conveyer mechanism 160 of the wagon elevator 41 is driven from gear 154 on shaft 155 of the auger feed through gears 161, 163 and 165, shaft 162, and chain 164. If there were a belt conveyer in place of the auger feed, there would have to be bevel gears placed between the belt conveyer and the gear 152 in line with the stub shaft 119 of the gear-box 114, since the driving axis of the belt conveyer would necessarily be at right angles to the axis of the gear 152. A set of bevel gears would also be required between the belt conveyer and the conveyer mechanism 160 of the wagon elevator.

It will be apparent from the foregoing description in connection with the figures of the drawings that a novel corn picker construction has been provided. There is a picker unit comprising rigidly attached husker and gathering units, and this is supported in balanced relation over the axle of a tractor. A rigid unit, comprising auger feed device and wagon elevator, is supported by the picker unit through attachment to the husker unit. The last mentioned unit is detachable from the picker unit, and the picker unit itself can be easily removed from the tractor. There may be either one or two picker units mounted on the tractor.

The picker units may also be considered to comprise, in addition to picking and husking mechanisms, the framework which extends along opposite sides of the tractor body and beneath the rear axle, and which pivotally supports the picking and husking mechanisms on the tractor, since the framework remains with the mechanisms when they are detached from the tractor.

The intention is to limit the invention only to the scope of the appended claims.

What is claimed is:

1. In combination, a tractor having a body and a rear axle extending from opposite sides thereof, a harvesting unit positioned at one side of the body over the rear axle, connecting means fastened to the rear side of the axle on each side of the body, supporting means fixed to the harvesting unit and including a cross member positioned beneath the axle, a first bracket on the same side of the body as the harvesting unit carrying the supporting means and fixed to the rear side of one of the connecting means with a portion in engagement with the upper side thereof, and a second bracket on the opposite side of the body also carrying the supporting means and fixed to the rear side of the other connecting means with a portion in engagement with the lower side thereof.

2. In combination, a tractor having a body and an axle extending from opposite sides thereof, connecting means fastened to the axle on opposite sides of the body, a harvesting unit positioned on one side of the body, a first supporting device fixed to the harvesting unit and to the connecting means on the same side of the body as the harvesting unit and having a portion in engagement with the top of the connecting means, and a second supporting device fixed to the harvesting unit and to the connecting means on the opposite side of the body and having a portion in engagement with the lower side of the connecting means.

3. In combination, a tractor having a body, a rear axle extending from opposite sides thereof, wheels at the ends of the rear axle spaced from the body, a harvesting unit positioned over the rear axle between the body and one of the wheels, a first cross member under the body parallel to the rear axle, a pair of supporting members extending from said cross member to spaced points on the harvesting unit, a second cross member positioned rearwardly of the body also parallel to the rear axle and connected adjacent one end to the rear of the harvesting unit, a third supporting member extending from the opposite end of the second cross member to the first cross member, connecting devices fastened to the rear of the axle on opposite sides of the body, a first bracket fastened to the rear of the connecting device on the same side of the body with a portion in engagement with the upper side of the connecting device and supporting the first cross member at a point adjacent the point of attachment of said pair of supporting members, and a second bracket fastened to the rear of the connecting device on the opposite side of the body with a portion in engagement with the under side of the connecting device and supporting the first cross member at a point adjacent the point of attachment of the third supporting member.

4. In combination, a tractor having a body and a rear axle extending from opposite sides thereof, a first cross member supported at spaced points by the rear axle beneath the same and parallel thereto, a first supporting member extending from the first cross member and adapted to be pivotally connected adjacent one end of a harvesting unit adapted to be positioned over the tractor axle at one side of the body, a second supporting member extending from adjacent the same point on the said first cross member as the first supporting member and adapted to be connected with the other end of the harvesting unit, members adapted to connect the first supporting member and the harvesting unit and being fixable with respect to one another, a second cross member rearwardly of and parallel to the rear axle and adapted to be connected adjacent one end to the rear end of the harvesting unit, and a third supporting member connecting the opposite end of the second cross member and the first cross member adjacent the point of support of the first cross member from the rear axle on the side of the body opposite to that of the harvesting unit.

5. In combination, a tractor having a body and an axle extending from opposite sides thereof, a corn harvesting unit positioned over the axle at one side of the body and composed of rigidly united gathering and husking units, connecting means attached to the rear axle on opposite sides of the body, a first bracket fastened to the connecting means on the same side of the body as the harvesting unit and having a portion in engagement with the upper side of the connecting means, a second bracket fastened to the connecting means on the opposite side of the body and having a portion in engagement with the lower side of the connecting means, a first cross member pivotally carried by the brackets under and parallel to the axle of the tractor, a first member rigidly attached to said first cross member adjacent the point of connection of the first bracket and pivotally connected to the gathering unit, a second member rigidly attached to said first shaft adjacent the same point and detachably connected to the husking unit, members extending between the first member and the gathering unit and being fixable relative to one another, a second cross member behind the tractor body and parallel to the rear axle connected at one end to the rear of the husking unit, and a third member connected to the other end of the second cross member and rigidly attached to the first cross member adjacent the point of connection of the second bracket.

6. In combination, a tractor having a body, a power take-off shaft extending from one end thereof, and an axle extending from opposite sides thereof, a harvesting unit positioned at one side of the body over one axle, a first cross member carried by the axle below and parallel to the same, members extending from adjacent a common point on the first cross member to spaced points on the harvesting unit, a second cross member carried at one end of the harvesting unit adjacent the power take-off shaft parallel to the axle of the tractor, and a gear-box carried by the said second cross member and having connections to the power take-off shaft and the harvesting unit.

7. In combination, a tractor having a body, a power take-off shaft at one end thereof, and an axle extending from opposite sides thereof, a corn harvesting unit positioned at one side of the body over the axle, a first cross member carried by the axle below the same, a pair of members extending from the first cross member to spaced points on the harvesting unit, a second cross member supported at one end by the harvesting unit and extending adjacent the power take-off shaft, a member carried by the first cross member and supporting the other end of the second cross member, and a gear-box carried by the second cross member and having connections to the power take-off shaft and the harvesting unit.

8. In combination, a tractor having a body, a power take-off shaft extending from one end thereof, and an axle extending from opposite sides thereof, harvesting units positioned on opposite sides of the power unit over the axle, a first cross member carried by the axle below the same, members extending from said first cross member to spaced points on the harvesting units, a second cross member extending between the harvesting units adjacent the power take-off shaft and a gear-box supported on the said second cross member and having connections to the power take-off shaft and the harvesting units.

9. In combination, a tractor having a body and an axle extending from opposite sides thereof, a harvesting unit positioned over the axle at one side of the body and composed of rigidly united husking and gathering units, a first cross member carried by the axle below the same, a pair of members extending from adjacent one end of said first cross member to spaced points on the said harvesting unit, a second cross member extending parallel to and spaced from the said first cross member and supported at one end by the said harvesting unit, a third member extending from the said first cross member and supporting the other end of the said second cross member, a conveying unit composed of rigidly united auger feed and wagon elevator sections carried at one side by the said harvesting unit, and a fourth member supporting the other side of the said conveying unit and connected to the said second cross member.

10. In combination, a wheeled frame, a harvesting unit pivotally mounted thereon, a wagon elevator pivotally mounted on the harvesting unit, a lever member pivotally mounted intermediate its ends on the frame, means connecting one end of the lever and the harvesting unit, and means connecting the other end of the lever and the wagon elevator.

11. In combination, a vehicle, a harvesting unit mounted thereon including gathering means arranged to move toward and away from the ground, a wagon elevator associated with the harvesting unit, and means mounted on the vehicle and connected to the harvesting unit and the wagon elevator for causing the wagon elevator to move upwardly as the gathering means is moved away from the ground.

12. In combination, a vehicle, a harvesting unit mounted thereon and including gathering means movable towards and from the ground, a wagon elevator associated with the harvesting unit, and means connecting the harvesting unit and the wagon elevator for preventing any substantial movement of the wagon elevator toward the ground as the gathering means is moved away from the ground.

13. In combination, a tractor having an axle extending from opposite sides thereof, harvesting units, each composed of rigidly united gathering and husking units positioned over the axle, a unit comprising an auger feed and a wagon elevator extending from a mid-point thereof and being pivotally supported on the harvesting units by attachment of the ends of the auger feed to the husking units, and means connecting the wagon elevator and gathering units for raising the wagon elevator as the gathering units are raised.

14. In combination, a tractor having an axle extending from one side thereof, a harvesting unit composed of rigidly united gathering and husking units positioned over the axle, a unit comprising an auger feed and a wagon elevator pivotally supported on the husking unit through attachment of the auger feed therewith, a lever pivotally mounted between its ends on the tractor, a first means connecting one end of the lever and the harvesting unit, and a second means connecting the other end of the lever and the wagon elevator whereby raising of the gathering unit effects a raising of the wagon elevator.

15. In combination, a tractor having an axle extending therefrom a part of which is exposed and another part of which is covered by an axle housing, a paddle mounted on the exposed portion and adapted to rotate therewith, a harvesting unit including a husking unit adjacent the paddle, and supporting means for the harvesting unit attached to the axle housing adjacent the paddle.

16. In combination, a tractor having an axle extending therefrom, a harvesting unit including a husking means having a beater therein adjacent the axle, and supporting means for the harvesting unit attached to the axle adjacent the beater.

17. The combination with a tractor having an axle extending therefrom, of a husking unit positioned adjacent the axle and having husking rolls extending generally at right angles to the axle, a husk conveyer extending toward the axle, a husk discharge opening adjacent the axle, and rotating means adjacent the opening for causing the husks to pass through the discharge opening in a direction away from the axle of the tractor.

18. The combination with a tractor having an axle extending therefrom, of a husking unit positioned adjacent the axle and having means therein for conveying husks toward the axle, and means adjacent the discharge end of the conveying means for deflecting the husks away from the axle of the tractor.

19. In combination, a tractor having an axle extending therefrom, deflecting means mounted thereon for rotation with the axle, and a husking unit having means therein for conveying husks toward the deflecting means on the axle of the tractor.

20. In combination, a tractor having an axle extending from opposite sides thereof, a pair of harvesting units, each comprising rigidly united husking and gathering units positioned over the axle on opposite sides of the tractor, a cross member carried by and below the axle, supporting means extending from the member and connected to the harvesting units at spaced points, and a rigid unit composed of an auger feed and a wagon elevator extending from a mid-point of the auger feed, said rigid unit being supported on the husking units of the harvesting units by attachment of the ends of the auger feed to the husking units.

21. In combination, a husking unit, a wagon elevator spaced therefrom, and a feed device extending between the husking unit and wagon elevator, said feed device comprising a shell having a side wall adjacent the husking unit, an elongated bearing sleeve supported in the said side wall, and an auger feed element supported entirely at one end in the bearing sleeve and having its other end free and unsupported in proximity to the wagon elevator.

22. In combination, a tractor having a rear axle, a picker unit including gathering and husking units pivotally carried by the rear axle at one side of the tractor, framework carried by the husker unit and pivotally carried by the tractor axle at the side opposite the picker unit, and a unit including a wagon elevator supported by and connected to the husking unit at one side and the framework at the other side, all the units being carried entirely by the tractor rear axle in balanced relation thereabout.

23. In combination, a tractor having a rear axle, picker units carried pivotally by the rear axle at both sides of the tractor and extending to the rear of the tractor, and a wagon elevator positioned at the rear of the tractor between the picker units and carried by the units, all the units being carried entirely by the tractor rear axle in balanced relation thereabout.

24. In combination, a tractor having a rear axle, means connected to and positioned beneath the rear axle and adapted to be connected with a crop-treating device for supporting the same, and members extending toward one another from points on the means and crop-treating device spaced from the connection of the means and device and being fixable with respect to one another against relative movement, whereby the means, when detached from the tractor axle, may rest on the ground and, with the aid of the members fixed against relative movement, support the crop-treating device detached from the tractor.

25. In combination, a tractor, a first means connected to and positioned beneath the tractor and adapted to be connected with a crop-treating device for supporting the same, and a second means adapted to connect points on the first means and the crop-treating device spaced from the connection of the first means and the device, whereby the first means, when detached from the tractor, may rest upon the ground and, with the aid of the second means holding its points of connection with the first means and the crop-treating device against relative movement, may support the crop-treating device detached from the tractor.

26. In combination, a tractor having an axle, and a first means adapted to connect the axle and points on a crop-treating device on both sides of the axle for supporting the device in balanced position over the axle with portions thereof below the top of the axle, said means including a part detachable from the axle so as to rest on the ground, and a second means adapted to connect points on the first means and the crop-treating device spaced from the points of connection of the first means with the device and being fixable so as to hold its points of connection with the first means and the device against relative movement whereby the part and the second means may hold the portion of the device at one side of the axle of the tractor higher than the axle so as to allow the tractor to be moved away from the device.

27. In combination, a tractor having an axle, and a frame carried by and below the axle and adapted to be pivotally connected to a crop-treating device at one side of the axle and to be detachably connected to the device at the other side of the axle, said device being adapted to be positioned over the tractor axle with portions extending on both sides of and below the top of the axle, and means adapted to connect points on the device and frame on the same side of the axle as the pivotal connection of the frame and the device but spaced from said pivotal connection, whereby the frame, detached from the axle and from the portion of the device at one side of the axle, may rest upon the ground and, with the aid of the means fixed to hold its points of connection with the device and the frame against relative movement, may hold the portion of the device at the said one side of the tractor axle higher than the axle so as to permit the tractor to be moved away from the device.

28. In combination, a tractor having a rear axle extending from one side thereof, and a frame having a first portion detachably carried by and below the rear axle, a second relatively short portion extending from the first portion and adapted to be detachably connected with a portion of a crop-treating device, rearward of and below the top of the tractor axle, said device being adapted to extend over the tractor axle and forwardly and downwardly to a point adjacent the ground, and a third portion of the frame extending from the first portion thereof and adapted to be pivotally connected with a portion of the crop-treating device extending forwardly of and below the axle to a point adjacent the ground, and means adapted to connect points on the third portion of the frame and the portion of the crop-treating device ahead of the rear axle, said points being spaced from the pivotal connection of the frame and the crop-treating device, whereby the frame, when the first and second portions thereof are detached from the tractor axle and the crop-treating device, respectively, may rest upon the ground along with the portion of the crop-treating device ahead of the tractor axle and, with the aid of the means fixed to hold its points of connection with the frame and the crop-treating device against relative movement, may hold the portion of the device rearward of the tractor axle higher than the axle in an elevated or adjusted position so as to permit backing of the tractor away from the crop-treating device, the device being sufficiently elevated and the third portion of the frame being sufficiently short to permit the tractor axle to clear the device and third portion.

29. In combination, a tractor having a rear axle, a first means adapted to support a harvester unit and to be connected with the same forwardly of the rear axle and adapted to engage the ground, said harvester unit being positionable over the tractor axle so as to extend rearwardly and below the top thereof, and a second means adapted to connect the first means and the harvester unit at points forward of the axle and spaced from the connection of the means and the unit whereby the unit may be supported in an elevated position with the aid of the first and second means so as to permit backing out of the tractor.

30. In combination, a tractor having an axle, a first means adapted to be connected with spaced points on a crop-treating device for supporting the same over the tractor axle, a second means detachable from a position beneath the tractor so as to rest on the ground and adapted to be connected with the crop-treating device, and a third means adapted to connect the second means and a point on the crop-treating device spaced from the connection of the second means with the device for sustaining, with the aid of the second means, the crop-treating device detached from the tractor in a stable position upon the ground.

31. An implement attaching frame for tractors comprising lower frame structure adapted to extend below the upper surface of the rear axle structure of a tractor and adapted to be pivotally connected to an upper frame structure for a harvesting unit forwardly of the rear axle structure, said upper frame structure being adapted to extend upwardly and rearwardly over said axle structure, means adapted detachably to connect said lower frame structure to the rear axle structure, detachable means adapted to support the frame structures rigidly relative to each other, and means adapted to hold the frame structures in swung-apart position to support the upper frame structure at a height to clear the axle structure of the tractor during removal or attaching of the frame to the tractor with the lower frame structure engaging the ground to provide a self sustaining support for the frame.

32. An implement attaching frame for tractors comprising lower frame structure adapted to extend below the upper surface of the rear axle structure of a tractor and adapted to be pivotally connected to an upper frame structure forwardly of the rear axle structure, said upper frame structure being adapted to extend upwardly and rearwardly over said axle structure, said upper frame structure having a rear portion adapted to extend downwardly behind the rear axle, means adapted pivotally and detachably to connect said lower frame structure to the rear axle structure in a plurality of fore and aft positions, detachable means at the rear of the axle structure adapted to support the frame structures rigidly relative to each other for pivoting movement as a unit on the tractor, and means forwardly of the rear axle adapted to support the frame structures in swung-apart position to support the rear portion of the upper frame structures at a height to clear the axle structure of the tractor during removal or attaching of the frame with the lower frame structure engaging the ground to provide a self-sustaining support for the frame.

33. In combination, a tractor having a body and an extended rear axle supported on traction wheels, a cross member supported by and under the rear axle on both sides of the body, supporting members extending on opposite sides of the tractor axle from the cross member, means for connecting one supporting member pivotally to a harvesting unit at one side of the tractor axle, means for connecting the other supporting member detachably to the harvesting unit at the other side of the tractor axle, members for connecting one of the supporting members and the harvesting unit, and means for fixing the last-mentioned members with respect to one another for sustaining the harvester unit detached from the tractor with the aid of the cross member resting on the ground.

34. In combination, a tractor having a rear axle, a cross member carried by the rear axle, supporting means extending from the member for connecting the same to a harvesting unit at spaced points, members for connecting the supporting means and the unit, and means for fixing the members to one another for sustaining the harvesting unit detached from the tractor with the aid of the cross member engaging the ground.

35. A unit adapted for attachment to a tractor, comprising a harvesting device having a first portion and a second portion extending at a substantial angle from the first portion, a first long supporting member pivotally attached at one end to a point on the first portion of the unit spaced from the second portion, a second short supporting member extending from a rigid connection with the other end of the first supporting member and adapted to be detachably connected with the second portion, means for forming a connection to a tractor at the connection of the first and second supporting members, members extending from a mid-point of the first supporting member and a point between the gathering unit at a point spaced from the point of connection of the first supporting member, and means for fixing the last-mentioned members with respect to one another for sustaining the harvesting device.

36. A construction adapted for attachment to a tractor, comprising a crop-treating device, supporting means pivotally attached at one end to the device at one point and adapted to be detachably connected at the other end to the device at another point, means between the ends of the supporting means for connecting the same to the rear axle of a tractor, members connecting points on the supporting means and the device spaced from the point of pivotal attachment of the supporting means and device, and means for fixing the members with respect to one another.

37. In combination, a husking unit, a wagon elevator spaced therefrom, and a feed device extending between the husking unit and the wagon elevator, said feed device comprising an auger feed and a shell partially surrounding the lower side of the auger feed and having a portion extending away from the auger feed a considerable distance and another portion extending back toward the auger feed at an angle to the one portion and above the same, said shell constituting a protected storage chamber.

38. In combination, a tractor having a rear axle, picker units extending along opposite sides of the tractor and comprising supporting structure extending along opposite sides of the tractor and beneath the tractor rear axle and picking mechanisms extending along the supporting structure at opposite sides of the tractor, means supporting the picker units on the tractor in pivotal connection of the supporting structure with the tractor rear axle, and a wagon elevator positioned at the rear of the tractor between the picker units and carried by the picking units, all the units being carried entirely by the tractor rear axle in balanced relation thereabout.

39. In combination, a tractor having a rear axle, picker units extending along opposite sides of the tractor and comprising supporting structure extending along opposite sides of the tractor and beneath the tractor rear axle and picking mechanisms extending along the supporting structure at opposite sides of the tractor, means supporting the picker units on the tractor in pivotal connection of the supporting structure with the tractor, and a wagon elevator positioned at the rear of the tractor between the picker units and carried by the picking units, all the units being carried entirely by the tractor in balanced relation.

40. In combination, a tractor having a rear axle, picker units extending at both sides of the tractor and to the rear of the tractor and having a supporting structure pivotally carried by the rear axle and including a member extending transversely of the tractor generally below and parallel to the rear axle, and a wagon elevator positioned at the rear of the tractor between the picker units and carried by the units, all the units being carried entirely by the tractor axle in balanced relation thereabout.

41. In combination, a tractor having a rear axle, picker units extending at both sides of the tractor and to the rear of the tractor and comprising a supporting structure having members extending along opposite sides of the tractor and beneath the rear axle and a member extending transversely of the tractor and generally below and parallel to the rear axle and picking mechanisms extending along the members at opposite sides of the tractor, means supporting the picker units on the tractor in a pivotal connection of the supporting structure with the rear axle, and a wagon elevator positioned at the rear of the tractor between the picker units and carried by the units, all the units being carried entirely by the tractor axle in balanced relation thereabout.

42. In combination, a tractor having a body, a rear axle and wheels at the ends of the axle spaced from the body, picker units extending along opposite sides of the tractor body within the wheels and to the rear of the axle and comprising supporting structure extending along opposite sides of the tractor body between the wheels and the body and beneath the tractor rear axle and picking mechanisms extending along the supporting structure at opposite sides of the tractor between the wheels and the body, means supporting the picker units on the tractor in pivotal connection of the supporting structure with the tractor rear axle, a wagon elevator positioned at the rear of the tractor between the picker units and carried by the picking units, all the units being carried entirely by the tractor rear axle in balanced relation thereabout.

43. In combination, a tractor having a body, a rear axle, and wheels at the ends of the axle spaced from the body, picker units extending along opposite sides of the tractor body within the wheels and to the rear of the axle and comprising supporting structure extending along the opposite sides of the tractor body between the wheels and the body and beneath the tractor rear axle and picking mechanisms extending along the supporting structure at opposite sides of the tractor between the wheels and the body, means supporting the picker units on the tractor in pivotal connection of the supporting structure with the tractor, a wagon elevator positioned at the rear of the tractor between the picker units and carried by the picking units, all the units being carried entirely by the tractor in balanced relation.

44. In combination, a tractor having a body, a rear axle, and a wheel on the axle spaced from one side of the body, a picker unit extending along the said one side of the body to the rear of the tractor between the wheel and the body and comprising a supporting structure extending along the said side of the tractor body between the wheel and the body and beneath the tractor rear axle and picking mechanism extending along the supporting structure at the said side of the tractor body between the wheel and the body, means supporting the picker unit on the tractor in pivotal connection of the supporting structure with the tractor rear axle, and a wagon elevator positioned at the rear of the tractor and carried by the picking unit, the units being carried entirely by the tractor axle in balanced relation thereabout.

45. In combination, a tractor having a body, a rear axle having a portion extending transversely from the body, and a wheel on the axle spaced from the body, a harvester extending along the body between the wheel and the body from in front of the axle to in rear of the axle, and means mounting the harvester on the tractor for pivotal movement with respect thereto about an axis generally under and spaced vertically from the transversely extending portion of the tractor rear axle.

46. In combination, a tractor having a body, a rear axle, and a wheel on the axle spaced from one side of the body, a supporting framework extending along the said one side of the body and beneath the rear axle, means pivotally mounting the framework on the tractor, a corn harvester extending along the supporting framework between the wheel and the said side of the body and including longitudinally alined snapping means and husking means, and means mounting the corn harvester on the framework.

47. In combination, a tractor having a body, a rear axle, and a wheel at one end thereof, a harvester extending along the body between the body and the wheel from in front of the rear axle to the rear thereof and including longitudinally alined snapping means and husking means, and means supporting the harvester on the tractor for pivoting in balanced relation about a pivot axis generally beneath the rear axle.

48. In combination, a tractor having a body, a rear axle, and a wheel at one end thereof, a harvester extending along the body between the body and the wheel from in front of the rear axle to the rear thereof and including longitudinally alined snapping means and husking means, a supporting framework for the harvester extending beneath the tractor axle, and means pivotally connecting the framework to the rear axle for movement of the framework and harvester in balanced relation about a pivot axis.

49. In combination, a tractor having a body, a narrow front rolling support, a rear axle having portions extending transversely from opposite sides of the body, and wheels at the ends of the axle spaced from the body, picker units positioned at both ends of the body between the sides and the body and pivotally carried by the rear axle for pivotal movement with respect to the tractor about an axis generally under and spaced vertically from the transversely extending portions of the tractor rear axle, and a wagon elevator positioned at the rear of the tractor between the picker units and carried by the units, all the units being entirely carried by the tractor rear axle in balanced relation thereabout.

50. In combination, a tractor having a body, a rear axle, and wheels thereon, a picker unit pivotally carried by the tractor at one side thereof between the body and one wheel, supporting means extending from the opposite side of the tractor and being pivotally carried thereby, and a wagon elevator connected to and carried by the picking unit and by the supporting means, all the units being carried entirely by the tractor rear axle in balanced relation thereabout.

51. In combination, a tractor having a rear axle and wheels on the axle, a picker unit extending along one side of the tractor to the rear of the axle and comprising a supporting structure extending along the tractor and beneath the tractor rear axle and picking mechanism extending along one side of the tractor and carried entirely by the supporting structure, means supporting the picker unit on the tractor in pivotal connection of the supporting structure with the tractor rear axle entirely within the wheels, and a wagon elevator positioned at the rear of the tractor and carried by the picking unit, the units being carried entirely by the tractor axle in balanced relation thereabout.

52. In combination, a tractor having a rear axle and wheels on the axle, picker units extending along opposite sides of the tractor to the rear of the tractor and comprising supporting structure extending along opposite sides of the tractor and picking mechanisms extending along opposite sides of the tractor and carried entirely by the supporting structure, means supporting the picker units on the tractor in pivotal connection of the supporting structure with the tractor rear axle entirely within the wheels, and a wagon elevator positioned at the rear of the tractor between the picking units and carried by the units, all the units being carried entirely by the tractor rear axle in balanced relation thereabout.

53. In combination, a tractor having a body, a narrow front rolling support, a rear axle, and wheels on the axle spaced from the body, picker units at both sides of the body between the wheels and the body and carried pivotally by the rear axle and extending to the rear of the tractor and comprising supporting structure extending along opposite sides of the tractor and beneath the axle and between the wheels and the body, and longitudinally alined picking and husking mechanisms extending along opposite sides of the tractor between the wheels and the body and carried by the supporting structure, the picking mechanisms and the husking mechanisms each comprising means rotatable about an axis longitudinal of the tractor, means entirely supporting the picker units on the tractor in pivotal connection of the supporting structure entirely within the wheels, and a wagon elevator positioned at the rear of the tractor between the picking units and carried by the units, all the units being entirely carried by the tractor rear axle in balanced relation thereabout.

BENJAMIN M. HYMAN.
RECTOR C. FERGASON.